United States Patent
Iyer et al.

(10) Patent No.: US 9,432,848 B2
(45) Date of Patent: Aug. 30, 2016

(54) BAND STEERING FOR MULTI-BAND WIRELESS CLIENTS

(75) Inventors: Pradeep J. Iyer, Cupertino, CA (US); Keerti G. Melkote, San Jose, CA (US); Partha Narasimhan, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/363,309

(22) Filed: Jan. 31, 2012

(65) Prior Publication Data

US 2012/0243474 A1 Sep. 27, 2012

Related U.S. Application Data

(60) Continuation-in-part of application No. 13/168,789, filed on Jun. 24, 2011, now Pat. No. 8,750,272, which is a division of application No. 10/806,601, filed on Mar. 23, 2004, now Pat. No. 7,969,937, application No. 13/363,309, which is a continuation-in-part of application No. 13/156,215, filed on Jun. 8, 2011, now Pat. No. 8,699,418, which is a continuation-in-part of application No. 12/099,680, filed on Apr. 8, 2008, now abandoned.

(51) Int. Cl.
*H04W 12/12* (2009.01)
*H04L 29/06* (2006.01)
*H04W 8/22* (2009.01)
*H04W 8/26* (2009.01)
*H04W 12/06* (2009.01)
*H04W 48/18* (2009.01)

(52) U.S. Cl.
CPC .......... *H04W 12/12* (2013.01); *H04L 63/1466* (2013.01); *H04W 8/22* (2013.01); *H04W 8/26* (2013.01); *H04W 12/06* (2013.01); *H04W 48/18* (2013.01)

(58) Field of Classification Search
None
See application file for complete search history.

(56) References Cited

U.S. PATENT DOCUMENTS

| | | |
|---|---|---|
| 5,193,101 A | 3/1993 | McDonald et al. |
| 5,212,806 A | 5/1993 | Natarajan |
| 5,428,816 A | 6/1995 | Barnett et al. |
| 5,509,051 A | 4/1996 | Barnett et al. |
| 5,570,366 A | 10/1996 | Baker et al. |
| 5,640,677 A | 6/1997 | Karlsson |
| 5,673,307 A | 9/1997 | Holland et al. |
| 5,774,805 A | 6/1998 | Zicker |
| 5,815,811 A | 9/1998 | Pinard et al. |

(Continued)

OTHER PUBLICATIONS

International Patent Application No. PCT/US2013/024218, Notification of Transmittal of the International Search Report and the Written Opinion of the International Searching Authority, or the Declaration, mailed Apr. 17, 2013.

(Continued)

*Primary Examiner* — Donald Mills
(74) *Attorney, Agent, or Firm* — Mannava & Kang, P.C.

(57) ABSTRACT

Band steering for multi-band wireless clients. According to one embodiment of the invention, a method of operations comprises receiving, at a network device, a request from a wireless client device on a first wireless communication band. Thereafter, the network device identifies a unique address identifier associated with the wireless client device based on the received request and stores the unique address identifier in response to determining that the wireless client device is capable of communicating on the first wireless communication band.

26 Claims, 16 Drawing Sheets

(56) References Cited

U.S. PATENT DOCUMENTS

| | | | |
|---|---|---|---|
| 5,878,119 A | 3/1999 | Chellali et al. | |
| 5,878,328 A | 3/1999 | Chawla et al. | |
| 5,991,287 A | 11/1999 | Diepstraten et al. | |
| 6,038,444 A | 3/2000 | Schipper et al. | |
| 6,560,442 B1 | 5/2003 | Yost et al. | |
| 6,675,208 B1 | 1/2004 | Rai et al. | |
| 6,697,337 B1 | 2/2004 | Cafarelli et al. | |
| 6,842,726 B1 | 1/2005 | Scharosch et al. | |
| 6,957,067 B1 | 10/2005 | Iyer et al. | |
| 6,973,053 B1 | 12/2005 | Passman et al. | |
| 7,016,948 B1 | 3/2006 | Yildiz | |
| 7,031,336 B2 | 4/2006 | Scherzer et al. | |
| 7,042,865 B1 | 5/2006 | Meier et al. | |
| 7,075,904 B1 | 7/2006 | Manish et al. | |
| 7,079,850 B2 | 7/2006 | Cameron | |
| 7,113,498 B2 | 9/2006 | Bajic | |
| 7,116,980 B2 | 10/2006 | Bigler et al. | |
| 7,280,495 B1* | 10/2007 | Zweig et al. | 370/312 |
| 7,293,088 B2 | 11/2007 | Douglas et al. | |
| 7,301,926 B1 | 11/2007 | Dietrich et al. | |
| 7,313,113 B1 | 12/2007 | Hills et al. | |
| 7,330,472 B2 | 2/2008 | Kowalski | |
| 7,336,670 B1 | 2/2008 | Calhoun et al. | |
| 7,406,319 B2 | 7/2008 | Kostic et al. | |
| 7,424,268 B2 | 9/2008 | Diener et al. | |
| 7,453,840 B1 | 11/2008 | Dietrich et al. | |
| 7,471,629 B2 | 12/2008 | Melpignano | |
| 7,480,264 B1 | 1/2009 | Duo et al. | |
| 7,489,648 B2 | 2/2009 | Griswold | |
| 7,499,718 B2 | 3/2009 | Stephenson et al. | |
| 7,551,577 B2 | 6/2009 | McRae | |
| 7,558,235 B2 | 7/2009 | Lester et al. | |
| 7,577,453 B2 | 8/2009 | Matta | |
| 7,610,014 B2 | 10/2009 | Buckley | |
| 7,689,210 B1 | 3/2010 | Bims | |
| 7,797,018 B2 | 9/2010 | Chandra | |
| 7,957,742 B2 | 6/2011 | Kostic et al. | |
| 7,969,937 B2 | 6/2011 | Iyer et al. | |
| 7,969,950 B2 | 6/2011 | Iyer et al. | |
| 8,191,144 B2 | 5/2012 | Cam Winget et al. | |
| 8,331,345 B1* | 12/2012 | Loc et al. | 370/345 |
| 8,345,588 B2* | 1/2013 | Adachi et al. | 370/315 |
| 8,514,915 B2* | 8/2013 | Binder et al. | 375/219 |
| 8,699,418 B2* | 4/2014 | Iyer et al. | 370/328 |
| 2001/0018346 A1 | 8/2001 | Okajima et al. | |
| 2002/0159544 A1 | 10/2002 | Karaoguz | |
| 2002/0181418 A1 | 12/2002 | Awater et al. | |
| 2003/0039232 A1 | 2/2003 | Casati et al. | |
| 2003/0145092 A1 | 7/2003 | Funato et al. | |
| 2003/0199283 A1 | 10/2003 | Busch | |
| 2003/0227893 A1 | 12/2003 | Bajic | |
| 2004/0037247 A1 | 2/2004 | Ngo | |
| 2004/0039817 A1 | 2/2004 | Lee et al. | |
| 2004/0042609 A1 | 3/2004 | Delaney et al. | |
| 2004/0063427 A1 | 4/2004 | Narasimha et al. | |
| 2004/0063455 A1 | 4/2004 | Eran et al. | |
| 2004/0068668 A1 | 4/2004 | Lor et al. | |
| 2004/0102192 A1 | 5/2004 | Serceki | |
| 2004/0125775 A1 | 7/2004 | Rios | |
| 2004/0156336 A1 | 8/2004 | McFarland et al. | |
| 2004/0185852 A1 | 9/2004 | Son et al. | |
| 2004/0224690 A1 | 11/2004 | Choi et al. | |
| 2004/0243846 A1 | 12/2004 | Aboba et al. | |
| 2005/0003827 A1 | 1/2005 | Whelan | |
| 2005/0047371 A1 | 3/2005 | Bennett | |
| 2005/0058102 A1* | 3/2005 | Santhoff et al. | 370/335 |
| 2005/0059353 A1 | 3/2005 | Smith et al. | |
| 2005/0068925 A1 | 3/2005 | Palm et al. | |
| 2005/0070275 A1 | 3/2005 | Jeyaseelan et al. | |
| 2005/0073979 A1 | 4/2005 | Barber et al. | |
| 2005/0075142 A1 | 4/2005 | Hoffmann et al. | |
| 2005/0083210 A1 | 4/2005 | Shuey et al. | |
| 2005/0085259 A1 | 4/2005 | Conner et al. | |
| 2005/0086465 A1 | 4/2005 | Sapkota et al. | |
| 2005/0090259 A1 | 4/2005 | Jain et al. | |
| 2005/0119001 A1 | 6/2005 | Watanabe | |
| 2005/0128988 A1 | 6/2005 | Simpson et al. | |
| 2005/0128990 A1 | 6/2005 | Eom et al. | |
| 2005/0135270 A1 | 6/2005 | Larsen et al. | |
| 2005/0138178 A1 | 6/2005 | Astarabadi | |
| 2005/0141498 A1 | 6/2005 | Cam Winget et al. | |
| 2005/0157688 A1 | 7/2005 | Rydnell et al. | |
| 2005/0174955 A1 | 8/2005 | Phillips et al. | |
| 2005/0201341 A1 | 9/2005 | Griswold | |
| 2005/0207448 A1 | 9/2005 | Iyer et al. | |
| 2005/0213579 A1 | 9/2005 | Iyer et al. | |
| 2005/0227623 A1 | 10/2005 | Su et al. | |
| 2005/0245237 A1 | 11/2005 | Adachi et al. | |
| 2005/0277426 A1 | 12/2005 | Evans et al. | |
| 2006/0073827 A1 | 4/2006 | Vaisanen et al. | |
| 2006/0111103 A1 | 5/2006 | Jeong et al. | |
| 2006/0116170 A1 | 6/2006 | Brahmbhatt et al. | |
| 2006/0200540 A1 | 9/2006 | Morishima et al. | |
| 2007/0025486 A1 | 2/2007 | Gainey et al. | |
| 2007/0165537 A1 | 7/2007 | Magnusson et al. | |
| 2007/0281711 A1 | 12/2007 | Matta | |
| 2008/0031185 A1 | 2/2008 | Bims | |
| 2008/0062942 A1 | 3/2008 | Hills et al. | |
| 2008/0126455 A1 | 5/2008 | Francfort et al. | |
| 2008/0211641 A1 | 9/2008 | Murray et al. | |
| 2008/0259866 A1 | 10/2008 | Kostic et al. | |
| 2009/0252097 A1 | 10/2009 | Iyer et al. | |
| 2009/0253443 A1 | 10/2009 | Bichot | |
| 2009/0323531 A1* | 12/2009 | Matta | 370/235 |
| 2010/0296446 A1* | 11/2010 | Zhang et al. | 370/328 |
| 2010/0330914 A1 | 12/2010 | Chandra | |
| 2011/0038349 A1 | 2/2011 | Sun et al. | |
| 2011/0235591 A1 | 9/2011 | Iyer et al. | |
| 2011/0258696 A1 | 10/2011 | Iyer et al. | |
| 2012/0213159 A1 | 8/2012 | Iyer et al. | |
| 2012/0218931 A1 | 8/2012 | Iyer et al. | |
| 2012/0243474 A1 | 9/2012 | Iyer et al. | |

OTHER PUBLICATIONS

U.S. Appl. No. 12/099,680, Non-Final Office Action, mailed Feb. 3, 2011.

U.S. Appl. No. 12/099,680, Final Office Action, mailed Oct. 25, 2011.

U.S. Appl. No. 13/156,215, Non-Final Office Action, mailed Feb. 8, 2013.

Trapeze Networks, Mobility System Overview, 13 pages, 2004.

* cited by examiner

| MAC 3210 | Time of last probe req. 3220 | SNR of last probe req. 3230 | 5 GHz capable? 3240 | 2.4 GHz capable? 3250 |
|---|---|---|---|---|
| 00:13:ce:3e:60:bc | Apr 15 21:25:28 | 20 dB | N | Y |
| 00:04:13:21:04:54 | Apr 15 21:27:32 | 35 dB | Y | N |
| 00:0b:86:40:14:e0 | Apr 15 21:27:32 | 15 dB | Y | Y |
| 00:0b:86:64:c7:ae | Apr 15 21:32:07 | 40 dB | Y | Y |
| ⋮ | ⋮ | ⋮ | ⋮ | ⋮ |

FIG. 12

BAND STEERING FOR MULTI-BAND WIRELESS CLIENTS

CROSS REFERENCE TO RELATED APPLICATIONS

This application is a continuation-in-part of and claims benefit of priority on U.S. patent application Ser. No. 13/168,789, entitled "A System and Method for Centralized Station Management" and filed on 24 Jun. 2011, which is a divisional application of U.S. Pat. No. 7,969,937, entitled "A System and Method for Centralized Station Management" and filed on 23 Mar. 2004. This application is also a continuation-in-part of and claims benefit of priority on U.S. patent application Ser. No. 13/156,215, entitled "Band Steering for Multi-Band Wireless Clients" and filed on 8 Jun. 2011, which is a continuation-in-part of U.S. patent application Ser. No. 12/099,680, entitled "Band Steering for Multi-Band Wireless Clients," filed on 8 Apr. 2008. This application is related to U.S. patent application Ser. No. 13/098,184, entitled "Signal Strength Aware Band Steering," filed on 29 Apr. 2011. The disclosures of aforementioned patents and/or patent applications are hereby incorporated by reference in their entirety.

BACKGROUND OF THE INVENTION

The present invention relates to the operation of dual-band wireless digital networks, and to the process of assigning clients in dual-band networks.

Wireless digital networks, such as networks operating under IEEE 802.11 standards, are spreading in their popularity and availability. With such popularity, however, come problems of resource availability and use. While a user of such networks may just think of them as "wireless," those who plan and operate such networks usually have a deeper understanding. In many regulatory domains, such as the United States, channels are available for IEEE 802.11 wireless digital networks in both the 2.4 GHz and 5 GHz bands. More channels are available for use in the 5 GHz band, and therefore more capacity.

Many client devices are capable of operating on both 2.4 GHz and 5 GHz bands; many client devices are also limited to a single band, usually the older 2.4 GHz band.

What is needed are methods of "encouraging" dual-band capable clients to associate with channels in the "preferred" 5 GHz band where available, thus freeing up capacity in the "non-preferred" 2.4 GHz band for single-band clients.

BRIEF DESCRIPTION OF THE DRAWINGS

The invention may be best understood by referring to the following description and accompanying drawings that are used to illustrate embodiments of the invention in which:

FIG. 12 shows a diagram illustrating an example of media access controller (MAC) address list according to one embodiment of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the invention as claimed.

Overview

Embodiments of the invention relate to band steering for multi-band Wi-Fi clients. In a wireless digital network having one or more central controllers operating a plurality of single and multi-band access nodes where one band is preferred, a central controller identifies multi-band capable clients, and encourages such multi-band clients to connect to the preferred band.

Figure 1:
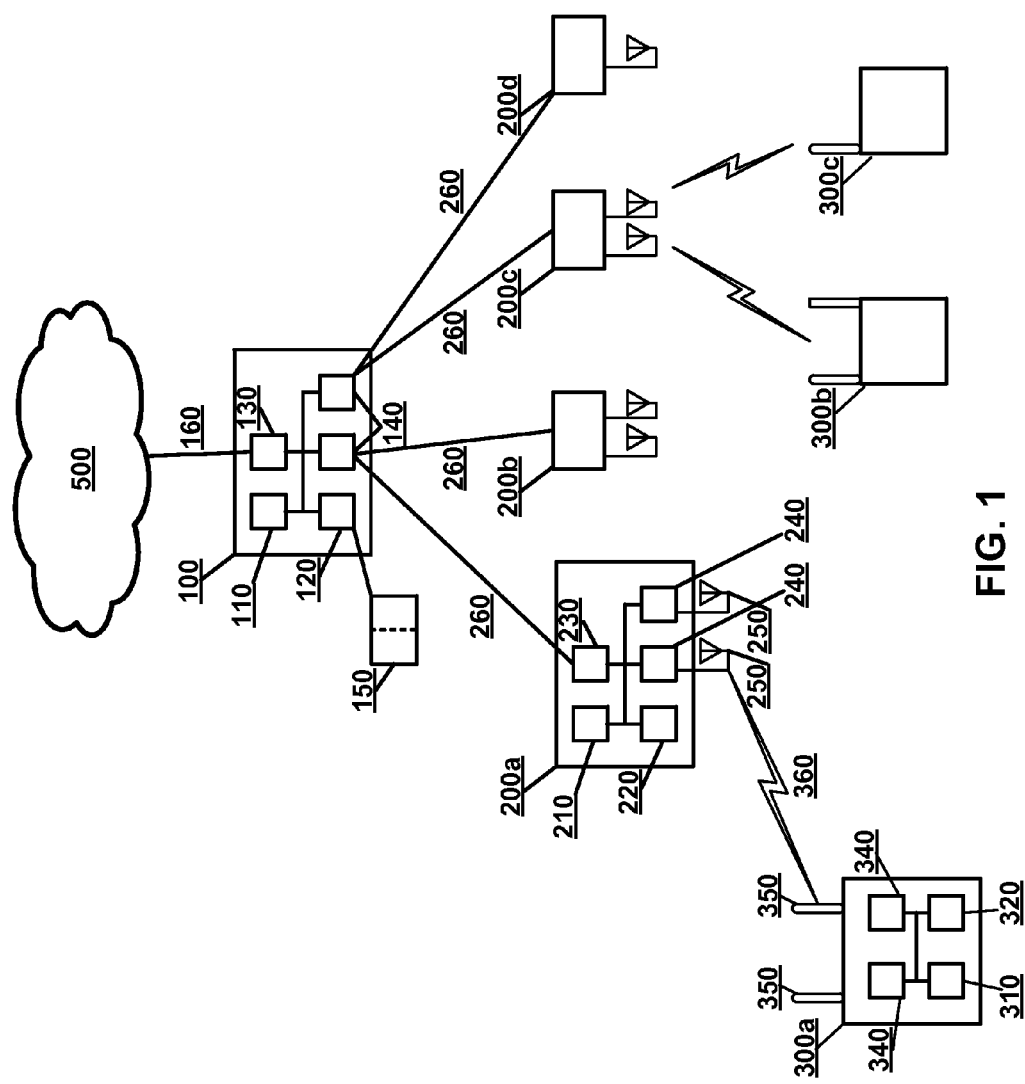
FIG. 1 shows a wireless network.

FIG. 1 shows an environment suitable for practicing the invention. Central controller 100 has central processing unit (CPU) 110 which connects to memory hierarchy 120, first network interface 130, and second network interfaces 140. Central controller 100 communicates 160 with network 500, which may contain other similar central controllers.

Central controller 100 connects 260 to access nodes 200a, 200b, 200c, 200d. Each access node 200 comprises a central processing unit 210 coupled to memory hierarchy 220, first network interface 230, and wireless network interfaces 240. Wireless network interfaces 240 are preferably wireless interfaces operating according to IEEE 802.11 standards, although other standards may be used, such as WiMAX. Where more than one wireless interface 240 is present in an access node, the different interfaces 240 operate using different frequency bands and antennas 250. As an example, an access node 200 may have as its first network interface an 802.3 wired Ethernet interface, and as its secondary network interfaces 240 a wireless IEEE 802.11 interface operating in the 2.4 GHz band, and a wireless IEEE 802.11 interface operating in the 5 GHz band. Other embodiments may contain, for example, wireless IEEE 802.11 interfaces, wireless interfaces for the 700 MHz band, and a wireless WiMAX interface.

According to the invention, one frequency band is considered the preferred band, and the other bands considered non-preferred. For the purposes of example, only two bands will be considered. In the case of IEEE 802.11 wireless networks, the 5 GHz band may be considered the preferred band and the 2.4 GHz band considered the non-preferred band. While this consideration may be made on the number of channels available, with more channels available on the 5 GHz band than on the 2.4 GHz band, the determination of which band is preferred among a group of bands may be made on other considerations as well. In some embodiments, this consideration may be based on coverage, on roaming characteristics, or on a desire to keep one band available for single-band only devices.

In central controller 100, CPU 110 is a MIPS-class CPU such as those from Cavium or Raza. CPUs from other manufacturers, such as Intel, AMD, ARM, or the like may also be used. Memory hierarchy 120 as understood by the art holds instructions and data necessary for practicing the invention on machine readable media and typically comprises a small amount of permanent storage for system initialization, fast read-write storage such as DRAM, and bulk storage such as hard disc or Compact Flash for storing files.

Similarly, with respect to access node 200, CPU 210 is a MIPS-class CPU such as those from Cavium or Raza. CPUs from other manufacturers, such as Intel, AMD, ARM, or the like may also be used. Memory hierarchy 220 as understood by the art holds instructions and data necessary for practicing the invention on machine readable media and typically comprises a small amount of permanent storage for system initialization, fast read-write storage such as DRAM, and bulk storage such as Compact Flash for storing files.

As understood by the art, the hardware platforms comprising central controller 100 and access nodes 200 may operate under control of target software running under a LINUX-variant operating system, or other operating system suitable for embedded devices.

Client devices 300a, 300b, 300c are also digital devices usually comprising CPU 310, memory hierarchy 320, displays, keyboards and the like, and one or more wireless interfaces 340 and antennas 350. Such client devices may range from small handheld units such as Wi-Fi phones having a single wireless interface such as for 2.4 GHz similar to 300c, or portable computers having wireless interfaces for both 2.4 GHz and 5 GHz, and possibly WiMAX.

According to an embodiment of the invention, a multi-band wireless network such as that shown in FIG. 1 has a plurality of access nodes connected to at least one central controller. Many of these access nodes support operation on more than one frequency band, with one band being preferred for operation over other bands. As an example, for IEEE 802.11 Wi-Fi networks in many regulatory domains, more channels are available in the 5 GHz frequency band, the preferred band according to the invention, than in the 2.4 GHz frequency band, the non-preferred band. When serving multi-band capable clients, such multi-band clients are encouraged to use the preferred band, which also leaves the non-preferred band available for those single-band only clients.

In such a wireless network, it is desirable to uniquely identify client devices. As an example, in IEEE 802.11 networks, devices may be identified by their media access controller (MAC) address. In operation, central controller 100 identifies dual-band capable clients. When a client device is identified as multi-band capable, central controller 100 stores this information in database 150.

A client device 300 may be identified as multi-band capable in a number of ways. One way a client device 300 is identified as multi-band capable is recording when an access node 200 receives a probe request on the preferred band, such as the 5 GHz band.

A client device 300 may advertise its capabilities, such as the capability to operate on multiple bands, in probe requests as well. By observing such behavior, and other behaviors such as activity of devices on preferred and non-preferred bands, central controller 100 may further identify and record in database 150 which client devices 300 are multi-band capable.

According to an embodiment of the present invention, as client devices are identified as multi-band capable, this information is stored in a database 150 in central controller 100. Central controller 100 may store this information in a separate database denoting multi-band capability, or it may store this information as a field in an existing database kept by MAC address or other suitable unique client device identifier.

Central controller 100 shares the list of multi-band capable clients with other central controllers on network 500, and with access nodes 200 connected to central controller 100. This information may be pushed out by central controller 100, or it may be pulled out by access nodes 100 and other central controllers 100 on network 500. When a new access node 200 connects to central controller 100, the list of multi-band capable clients is sent to the new access node.

When a central controller receives information identifying a new client device as multi-band capable, it may push this information out to associated access nodes 200 immediately. Alternatively, central controller 100 may hold that information for periodic updates of access nodes 200, or hold the information until requested by access nodes 200.

In another embodiment of the invention, as client devices are identified as multi-band capable, and that information is sent by an access node 200 to central controller 100, central controller 100 resends this information to all access nodes 200, and any other central controllers 100 on network 500. In this manner, a central database is not kept on central controller 100, rather central controller 100 acts as a distribution point, supplying updates to access nodes 200 and other central controllers 100.

Once a client device 200 has been identified as multi-band capable by a central controller such as central controller 100, when client device 200 attempts to connect to an access node 300, it is encouraged to connect to the preferred band. Methods for accomplishing this include not responding to probe requests on the non-preferred band(s), denying association attempts on the non-preferred band(s), and accepting a client on the non-preferred band(s) but then moving such client to the preferred band using techniques such as 802.11v directed roaming, or by de-authentication and re-authentication.

As an example, if the 5 GHz band is the preferred band, and the 2.4 GHz band is the non-preferred band, when a client device 300 sends a probe request to an access node 200 on a non-preferred band, access node 200 checks its internal database to see if the client device has been identified as multi-band capable. If the client device has been identified as multi-band capable, then access node 200 ignores the probe request on the non-preferred band. When the client device sends a probe request in the preferred band, for example the 5 GHz band, that probe request receives a response, and the client device will connect on the preferred, in this example, 5 GHz band.

In an embodiment of the invention, central controller 100 commands attached access nodes 200 to scan clients in the background. Such a background scan may identify additional client devices as multi-band capable.

In an embodiment of the invention, when a client device which is connected to the non-preferred band, in this example the 2.4 GHz band, is identified as multi-band capable, the current connection between client device 300 and access node 200 may be maintained, with the client device moving to the preferred band when it next connects, or the client device may be moved from non-preferred to preferred band. In one embodiment, IEEE 802.11v directed roaming may be used. In another embodiment, central controller 100 sends a de-authentication message through the access node 200 to client device 300. When client device 300 re-authenticates, its probe requests to access node 200 will not receive responses, and so client device 300 will attempt to re-authenticate on the preferred band, in this example the 5 GHz band.

Centralized Station Management

Some embodiments of the invention relate to a centralized mechanism for managing operations of and communications within a wireless network. According to one illustrative embodiment, the centralized mechanism may be deployed as station management logic (STM) within a wireless network switch. This logic may be deployed as a software module, executed by a processor, that is configured to handle the processing of a plurality of management messages during an Association phase between a STA and an AP, including but not limited or restricted to one or more of the following: PROBE REQUEST, PROBE RESPONSE, AUTHENTICATION, DEAUTHENTICATION, ASSOCIATION REQUEST, ASSOCIATION RESPONSE, REASSOCIATION REQUEST, REASSOCIATION RESPONSE and DISASSOCATION. Moreover, the station management logic (STM) is configured to provide security protection, load balancing, coverage hole detection, and broadcast/multicast traffic reduction.

Herein, the invention may be applicable to a variety of wireless networks such as a wireless local area network (WLAN) or wireless personal area network (WPAN). The wireless network may be configured in accordance with any wireless communication protocol. Examples of various types of wireless communication protocols include Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); or an IEEE 802.11g standard entitled "Wireless LAN Medium Access Control (MAC) and Physical Layer (PHY) specifications: Further Higher Data Rate Extension in the 2.4 GHz Band" (IEEE 802.11g, 2003).

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

I. General Architecture

Figure 2:
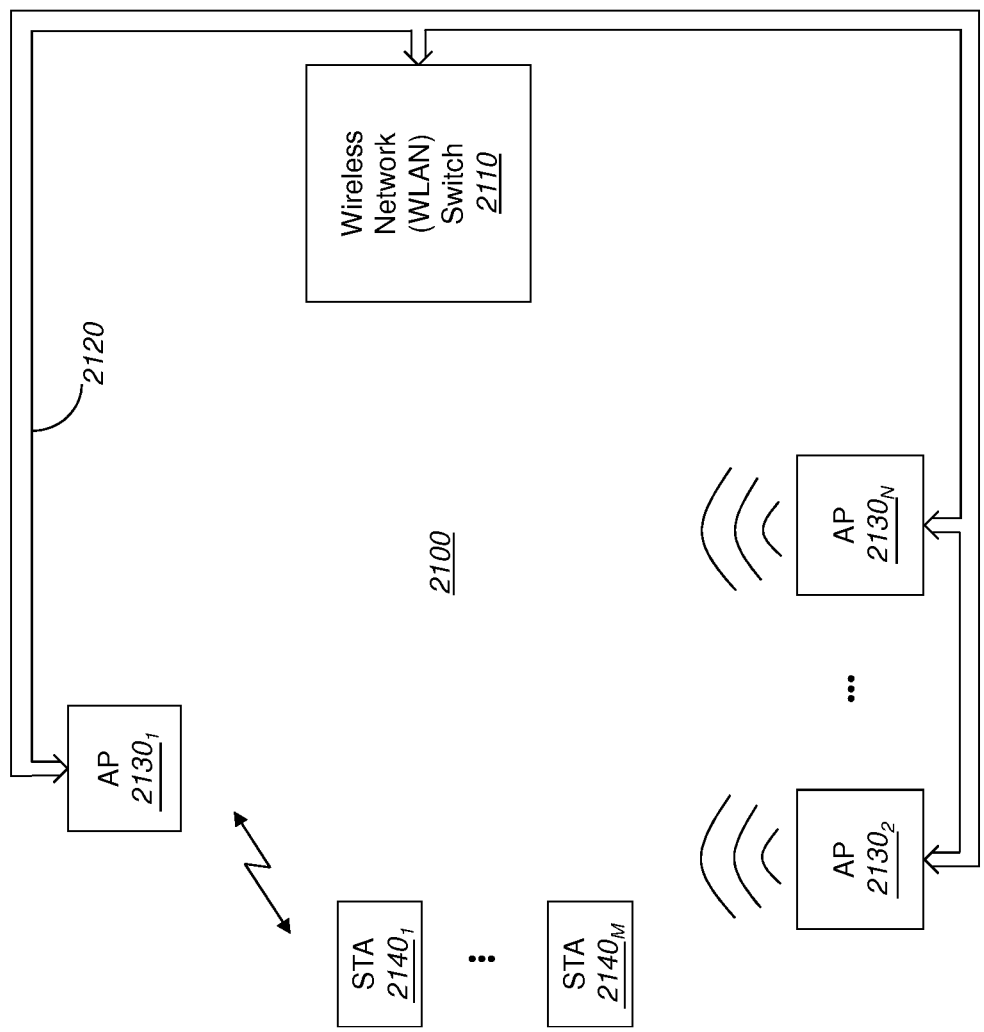
FIG. 2 shows an exemplary embodiment of a wireless network.

Referring to FIG. 2, an exemplary embodiment of a wireless network 2100 having a centralized mechanism to manage the operations of and communications within wireless network 2100 is illustrated. According to this embodiment of the invention, wireless network 2100 is deployed as a wireless local area network (WLAN) that comprises one or more wireless network switches 2110 (e.g., WLAN switch) in communication with one or more access points (APs) $2130_1$-$2130_N$ (where N>1) over an interconnect 2120. Interconnect 2120 may be a wired or wireless information-carrying medium or even a mesh network for example. In addition, one or more wireless stations (STAs) $2140_1$-$2140_M$ (M>1) are in communication with APs $2130_1$-$2130_N$ over wireless interconnects 2150.

As shown in FIGS. 1 and 2, WLAN switch 2110 comprises logic 2200 that supports communications with APs $2130_1$-$2130_N$ over interconnect 2120. Moreover, the wired network features resources that are available for users of wireless network 2100. Such resources may include database or data storage servers.

WLAN switch 2110 supports bi-directional communications by receiving messages from and transmitting messages to one or more targeted APs $2130_1$, . . . , $2130_N$ over interconnect 2120. Interconnect 2120 may be part of any type of private or public wired network, including but not limited or restricted to Ethernet, Token Ring, Asynchronous Transfer Mode (ATM), Internet or the like. The network communication protocol utilized over interconnect 2120 may be selected from a variety of protocols, including TCP/IP.

More specifically, logic 2200 of WLAN switch 2110 comprises station management logic (STM) 2210 and a wired or wireless connector 2220. Connector 2220 enables an exchange of information between a wired network and station management logic 2210. For instance, connector 2220 may provide coupling for a plurality of Ethernet interconnects, serial interconnects and the like to enable access with APs over a wired public or private network.

Herein, station management logic 2210 processes information extracted from the wireless message. According to one embodiment of the invention, station management logic 2210 is implemented as a processor executing a program, stored in memory, that is configured to provide centralized management involving security protection, load balancing, coverage hole detection, and broadcast/multicast traffic reduction of wireless network 2100. Alternatively, station management logic 2210 may be a state machine. Regardless of the chosen architectural implementation, in order to provide such centralized management, different information is received, extracted and processed as described below.

Referring back to FIG. 2, each AP $2130_1, \ldots,$ or $2130_N$ supports bi-directional communications by receiving wireless messages from any or all of the STAs $2140_1$-$2140_M$ in its coverage area and transferring data from the messages over interconnect 2120 to which WLAN switch 2110 is coupled.

STA $2140_1$ is adapted to communicate with and accesses information from any associated AP. For instance, STA $2140_1$ is associated with AP $2130_1$ and communicates over the air in accordance with a selected wireless communications protocol. Hence, AP $2130_1$ generally operates as a transparent bridge connecting both wireless network 2100 featuring STA $2140_1$ with the wired network.

According to one embodiment, STA $2140_1$ comprises a removable, wireless network interface card (NIC) that is separate from or employed within a wireless device that processes information (e.g., computer, personal digital assistant "PDA", telephone, alphanumeric pager, etc.). Normally, the NIC comprises a wireless transceiver, although it is contemplated that the NIC may feature only receive (RX) or transmit (TX) functionality such that only a receiver or transmitter is implemented.

II. Security

Figure 4A:
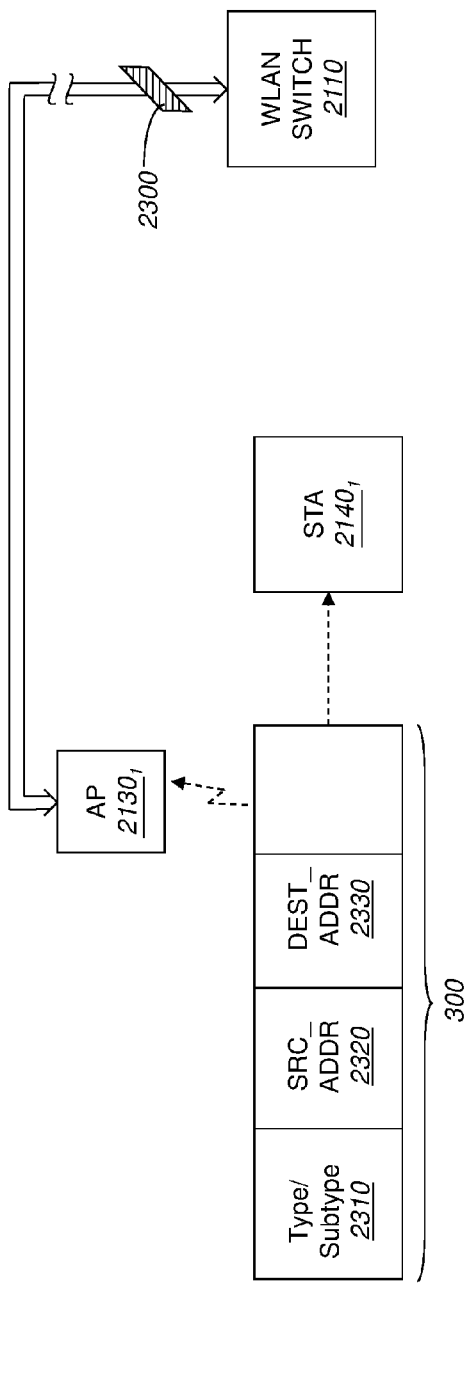
FIG. 4A is an exemplary embodiment of the wireless network switch operating in cooperation with an Access Point (AP) to respond to a security attack on a wireless station (STA) of the wireless network.

Referring now to FIG. 4A, an exemplary embodiment of a wireless network switch (e.g., WLAN switch 2110) operating in cooperation with one or more access points (e.g., AP $2130_1$) to respond to a security attack on a wireless station (STA $2140_1$) is shown. One common security attack is a "man-in-the-middle" attack that involves an attacker assuming the identity of an AP or STA and sending DEAUTHENTICATION messages to the other. This disrupts communications between AP $2130_1$ and STA $2140_1$ so that the attacker can monitor ("sniff") for passwords and other information as communication is reestablished.

Since message headers (e.g., IEEE 802.11 headers) are not encrypted, the attacker can obtain Media Access Control (MAC) addresses for both AP $2130_1$ and STA $2140_1$. While it is easy to prevent a man-in-the-middle attack against AP $2130_1$, it is difficult to prevent such attacks against STA $2140_1$, which is beyond the control of AP $2130_1$. Centralized station management deployed within WLAN switch 2110 allows more effective solution to curtail the man-in-the-middle attack.

Herein, STA $2140_1$ receives a DEAUTHENTICATION message 2300 that impersonates origination from AP $2130_1$. However, since STA $2140_1$ is in the coverage area for AP $2130_1$, AP $2130_1$ detects DEAUTHENTICATION message 2300 and forwarded the same to WLAN switch 2110 for processing. Upon analysis of the type and subtype fields 2310 of DEAUTHENTICATION message 2300, WLAN switch 2110 is able to determine that a DEAUTHENTICATION message has been received.

In particular, during normal operations, WLAN switch 2110 is responsible for generating all valid DEAUTHENTICATION messages to STAs. Hence, according to one embodiment of the invention, station management software executed within WLAN switch 2110 is able to immediately determine whether DEAUTHENTICATION message 2300 is invalid through analysis of a source address (SRC_ADDR) 2320 and/or destination address (DEST_ADDR) 2330.

For instance, according to one embodiment of the invention, if DEST_ADDR 2330 indicates that the STA $2140_1$ is the targeted device, but WLAN switch 2110 has no record of generating DEAUTHENTICATION message 2300, DEAUTHENTICATION message 2300 is deemed invalid. Namely, DEST_ADDR 2330 of DEAUTHENICATION message 2300 is compared to corresponding information from all valid DEAUTHENICATION messages recently transmitted from WLAN switch 2110. Data associated with recent, valid DEAUTHENTICATION messages are stored within a table accessible by WLAN switch 2110. If no match is detected, DEAUTHENTICATION message 2300 is invalid. This causes WLAN switch 2110 to block communications generated by STA $2140_1$ for associating with any AP $2130_1, \ldots$ or $2130_N$.

Figure 4B:
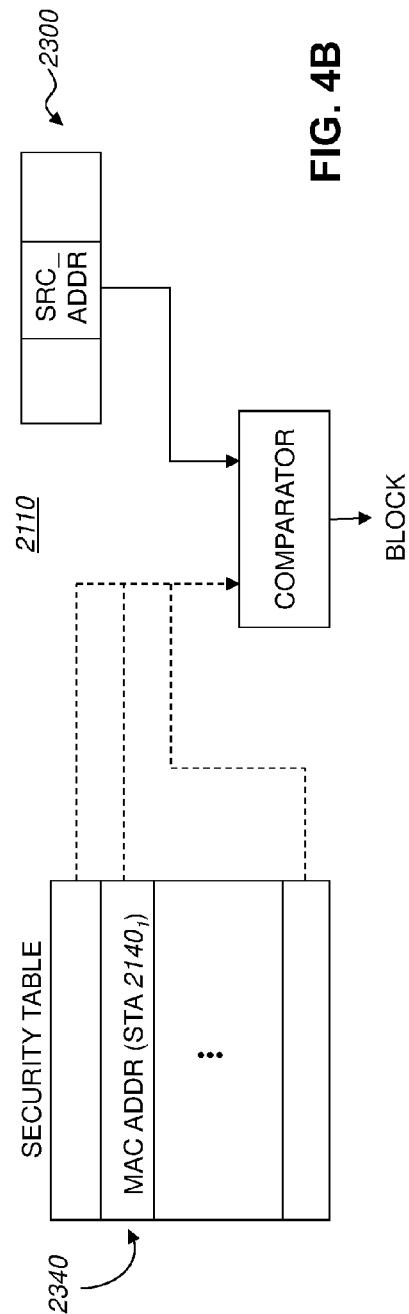
FIG. 4B is an exemplary embodiment of the operations of station management logic for a wireless network switch to block communications by a station under a security attack.

According to one embodiment of the invention, as shown in FIG. 4B, WLAN switch 2110 places the MAC address of STA $2140_1$ into a security table 2340. Thereafter, WLAN switch 2110 sends a message to an AP (e.g., AP $2130_2$), to which STA $2140_1$ is currently associated, to disassociate itself from STA $2140_1$. Thereafter, upon receipt of any PROBE REQUEST, ASSOCIATION REQUEST or REASSOCIATION REQUEST messages transferred any AP $2130_1, \ldots$ or $2130_N$ in wireless network 2100, WLAN switch 2110 accesses security table 2340 to determine whether the station initiating the request message, such as STA $2140_1$, is blocked. This may be accomplished by comparison of the SRC_ADDR of the request message to contents of security table 2340 as shown.

If the station initiating the request is blocked, the request message is denied. STA $2140_1$ may be precluded from freely communicating with any APs $2130_1$-$2130_N$ of wireless network 2100 for either (i) a prescribed time period, which may be static or programmable for each network, or (ii) an indefinite duration until the network administrator removes STA $2140_1$ from security table 2340.

Figure 5:
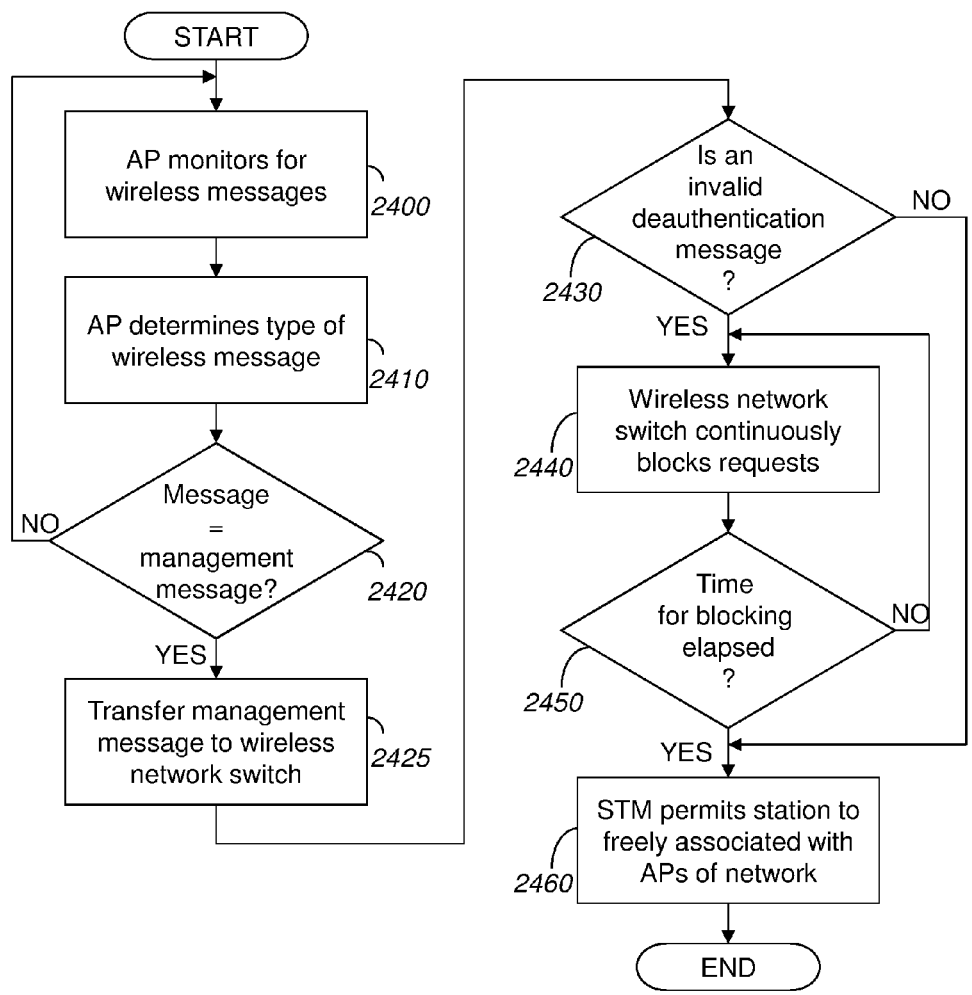
FIG. 5 is an exemplary embodiment of a method of operation of the wireless network switch responding to a security attack.

Referring to FIG. 5, an exemplary embodiment of a method of operation of a wireless network switch, such as a WLAN switch for example, responding to a security attack is shown. First, within its coverage area, an AP monitors the airwaves within its coverage area for broadcast, multicast and addressed wireless messages (operation 2400). For each received wireless message, the AP determines the particular type of wireless message received (operation 2410). This is accomplished by analyzing a message (or frame) type field in the header of the message. Upon determining a detected wireless message is a management message, such as a DEAUTHENTICATION message for example, the AP forwards the DEAUTHENTICATION message to the station management logic of the wireless network switch (operations 2420 and 2425).

During normal operations, the station management logic generates all valid DEAUTHENTICATION messages to STAs. Upon receipt of the DEAUTHENTICATION message, which has been generated by a device other than the wireless network switch, the station management logic knows that a targeted STA is being attacked by reviewing of the DEST_ADDR of DEAUTHENTICATION message with records of recently generated DEAUTHENTICATION messages for example (operation 2430). This causes the station management logic to continuously block requests made by the targeted STA (operation 2440). These requests include a PROBE REQUEST, an ASSOCIATION REQUEST, a REASSOCIATION REQUEST and the like.

According to one embodiment of the invention, requests from the targeted STA are blocked by the station management logic monitoring for management messages from the targeted STA (e.g., analyzing source address of a PROBE REQUEST, ASSOCIATION REQUEST, or REASSOCIATION REQUEST). Upon discovery, station management logic generates a message to the AP to deny such request.

After it is no longer necessary to block requests from the targeted STA, the targeted STA is permitted by the station management logic to freely associate with any AP (operations 2450 and 2460). Such blocking may be lifted by the station management logic if (1) the network administrator manually clears the targeted STA from a block list, or (2) a prescribed time period for blocking requests by STA has elapsed. The prescribed time may automatically elapse if based on a policy rule established by the network administrator.

III. Load Balancing

Figure 6:
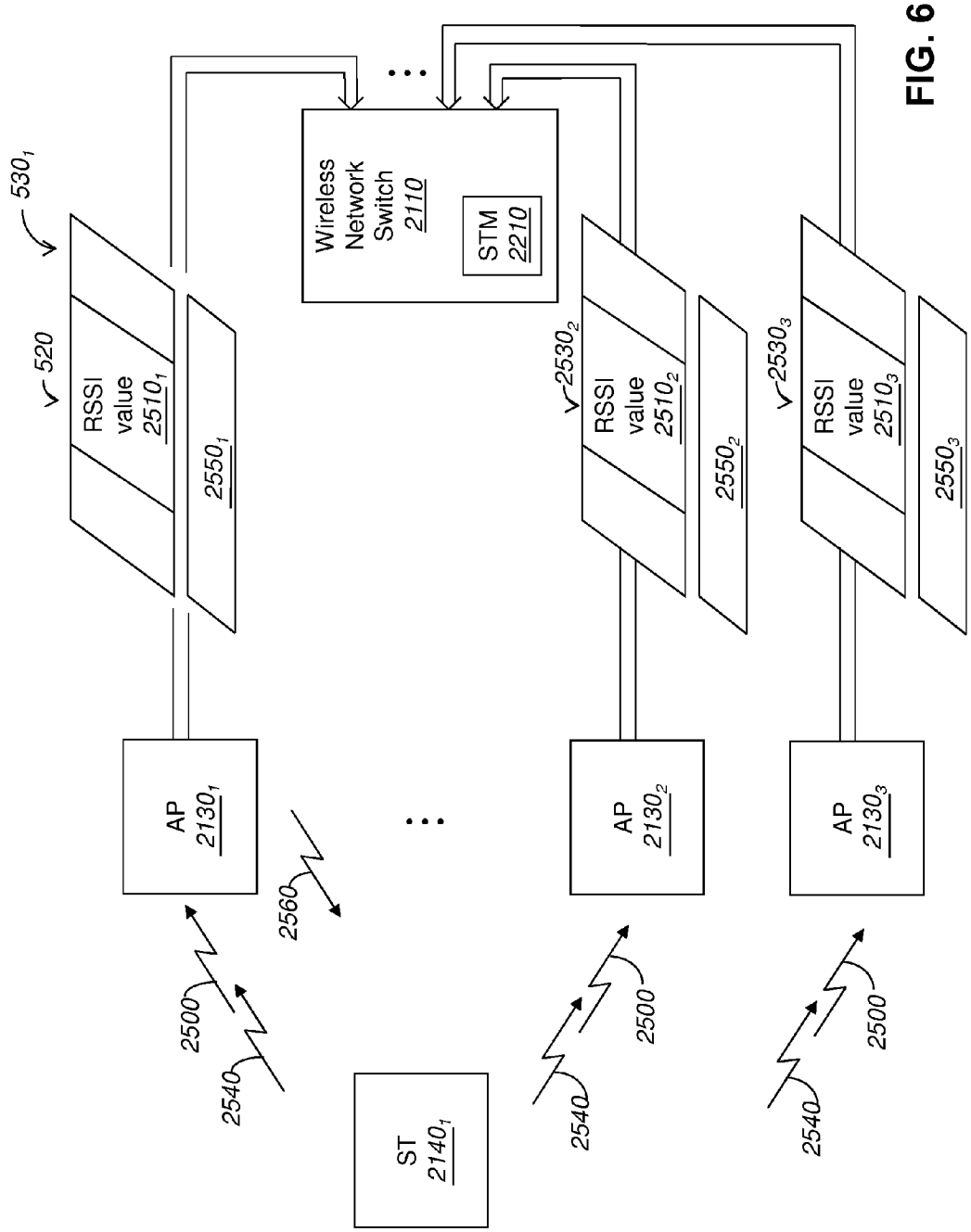
FIG. 6 is an exemplary embodiment of the wireless network switch operating in cooperation with a wireless station (STA) for centralized load balancing for the wireless network.

Referring now to FIG. 6, an exemplary embodiment of wireless network switch 2110 operating in cooperation with one or more access points (e.g., AP $2130_1$, AP $2130_2$, AP $2130_3$) and a wireless station (STA $2140_1$) attempting to associate with one of the APs $2130_1$-$2130_3$ is shown. In particular, station management logic 2210 of wireless network switch 2110 provides centralized control in steering STA $2140_1$ to a suitable AP during the Association phase.

STA $2140_1$ is configured to associate with an AP through passive scanning (beacons) or active scanning. "Active scanning" involves STA $2140_1$ broadcasting a PROBE REQUEST message 2500 to all APs capable of receiving the request on multiple channels. For this embodiment, APs $2130_1$-$2130_3$ receive a first PROBE REQUEST message 2500. However, instead of each AP $2130_1$-$2130_3$ returning a response to STA $2140_1$, first PROBE REQUEST message 2500 is altered and subsequently routed to station management logic 2210.

More specifically, upon receipt of first PROBE REQUEST message 2500, each AP $2130_1$-$2130_3$ measures the received signal strength for first PROBE REQUEST message 2500 and generates a corresponding received signal strength indicator (RSSI) value $2510_1$-$2510_3$. At each AP $2130_1$-$2130_3$, the RSSI value $2510_1$-$2510_3$ is loaded into a field 2520 of first PROBE REQUEST 2500 (e.g., Duration ID field) to produce modified Probe Requests $2530_1$-$2530_3$, respectively. Thereafter, modified Probe Request messages $2530_1$-$2530_3$ are transferred to station management logic 2210 from AP $2130_1$-$2130_3$, respectively. At this time, station management logic (STM) 2210 does not respond to modified Probe Request messages $2530_1$-$2530_3$, but rather awaits a second set of Probe Request messages $2550_1$-$2550_3$ or modified versions thereof.

As shown, in response to a second PROBE REQUEST message 2540, AP $2130_1$-$2130_3$ collectively route the second set of Probe Request messages $2550_1$-$2550_3$ to station management logic 2210. It is contemplated that Probe Request messages $2550_1$-$2550_3$ may be modified to include the newly measured RSSI value. However, if the time duration between first PROBE REQUEST 2500 and second PROBE REQUEST message 2540 is nominal (e.g., a few milliseconds), modified Probe Request messages $2550_1$-$2550_3$ need not include an updated RSSI value.

It is contemplated that additional parameters, such as (i) number of users on AP $2130_1$-$2130_3$ or (ii) percentage of bandwidth utilization by AP $2130_1$-$2130_3$ for example, may be monitored by the AP themselves and periodically transferred to wireless network switch 2110. In this type of embodiment, the values of these parameters may be contained in fields of the first or second set of modified Probe Request messages $2530_1$-$2530_3$ or $2550_1$-$2550_3$, respectively. However, the number of users on AP $2130_1$-$2130_3$ and/or the percentage of bandwidth utilization by AP $2130_1$-$2130_3$ may be monitored by wireless network switch 2110 internally, where load balancing is activated when maximum or minimum thresholds are exceeded.

At this time, STM 2210 analyzes the RSSI values and/or load on each AP, and responds to second PROBE REQUEST message 2540 on behalf of the AP $2130_1$, . . . , or $2130_3$ selected to associate with STA $2140_1$ (e.g., AP $2130_1$). This allows STM 2210 to steer STA $2140_1$ to a suitable AP based on instantaneous load and proximity. Moreover, by ignoring an initial PROBE REQUEST by STA $2140_1$, this centralized Request/Response processing allows overloaded APs and/or APs remotely located from the STA to be hidden during the Association phase.

After PROBE RESPONSE message 2560 has been received, STA $2140_1$ starts the authentication and associate exchanges with the selected AP $2130_1$. Thereafter, communications are established between STA $2140_1$ and AP $2130_1$.

Figure 7:
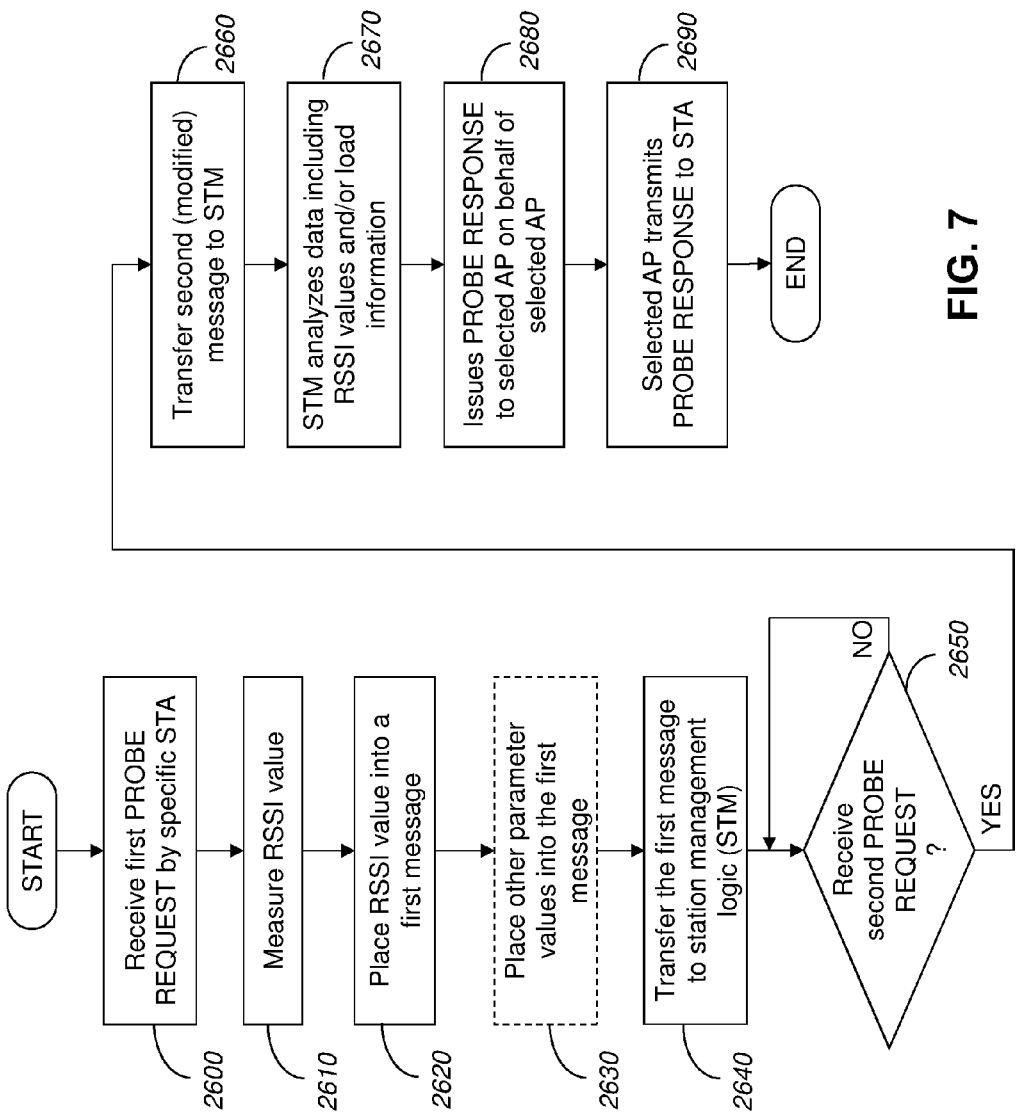
FIG. 7 is an exemplary embodiment of a method of operation of the wireless network switch for load balancing.

FIG. 7 is an exemplary embodiment of a method of operation of the wireless network switch for load balancing during an initial communication session. For this embodiment of the invention, STA sends a PROBE REQUEST message in an attempt to associate with an AP (operation 2600). The PROBE REQUEST message is usually sent to a broadcast address so that multiple APs can receive the PROBE REQUEST message. Upon receipt, each AP computes the RSSI value for the received PROBE REQUEST message (operation 2610). The RSSI value may be placed in an unused field of the PROBE REQUEST message for transfer to the STM (operation 2620). Of course, as shown as an optional operation 2630, other parameter values may be placed in unused field(s) of the PROBE REQUEST message such as load on the AP (e.g., number of users, percentage of bandwidth utilized, etc.). Thereafter, the modified PROBE REQUEST messages are transferred to the STM of the wireless network switch (operation 2640).

Alternatively, in lieu of sending modified versions of the received PROBE REQUEST message as described above, each AP may be configured to send a message other than a modified PROBE REQUEST message. This message would be inclusive of the RSSI value and only selected information from the received PROBE REQUEST message. For instance, the selected information may include (i) a code to identify that the message is a PROBE REQUEST message, (ii) an address of the STA generating the PROBE REQUEST message, (iii) load of the AP, etc.

Upon receipt of messages from the APs, generated in response to receipt of the PROBE REQUEST, the STM does not respond, but rather awaits a second set of messages produced in response to another (second) PROBE REQUEST message generated by the STA when the previous (first) PROBE REQUEST message was not responded to (operations 2650 and 2660). The second set of messages may be modified PROBE REQUEST messages including newly measured RSSI value and/or load information). However, if the time duration between the first PROBE REQUEST message and second PROBE REQUEST message is nominal (e.g., a few milliseconds), the second set of messages may be identical to the subsequent (second) PROBE REQUEST message or may be modified to include other information needed to determine the optimal AP to associate with the STA.

After receipt of the second set of messages, the STM analyzes the RSSI values and/or load on each AP, and responds to second PROBE REQUEST message on behalf of the AP selected to associate with STA (operations 2670, 2680 and 2690). By the station management logic hiding overloaded APs and/or APs remotely located from the STA during the Association phase, the overall wireless traffic is substantially reduced.

IV. Coverage Hole Detection

Figure 8:
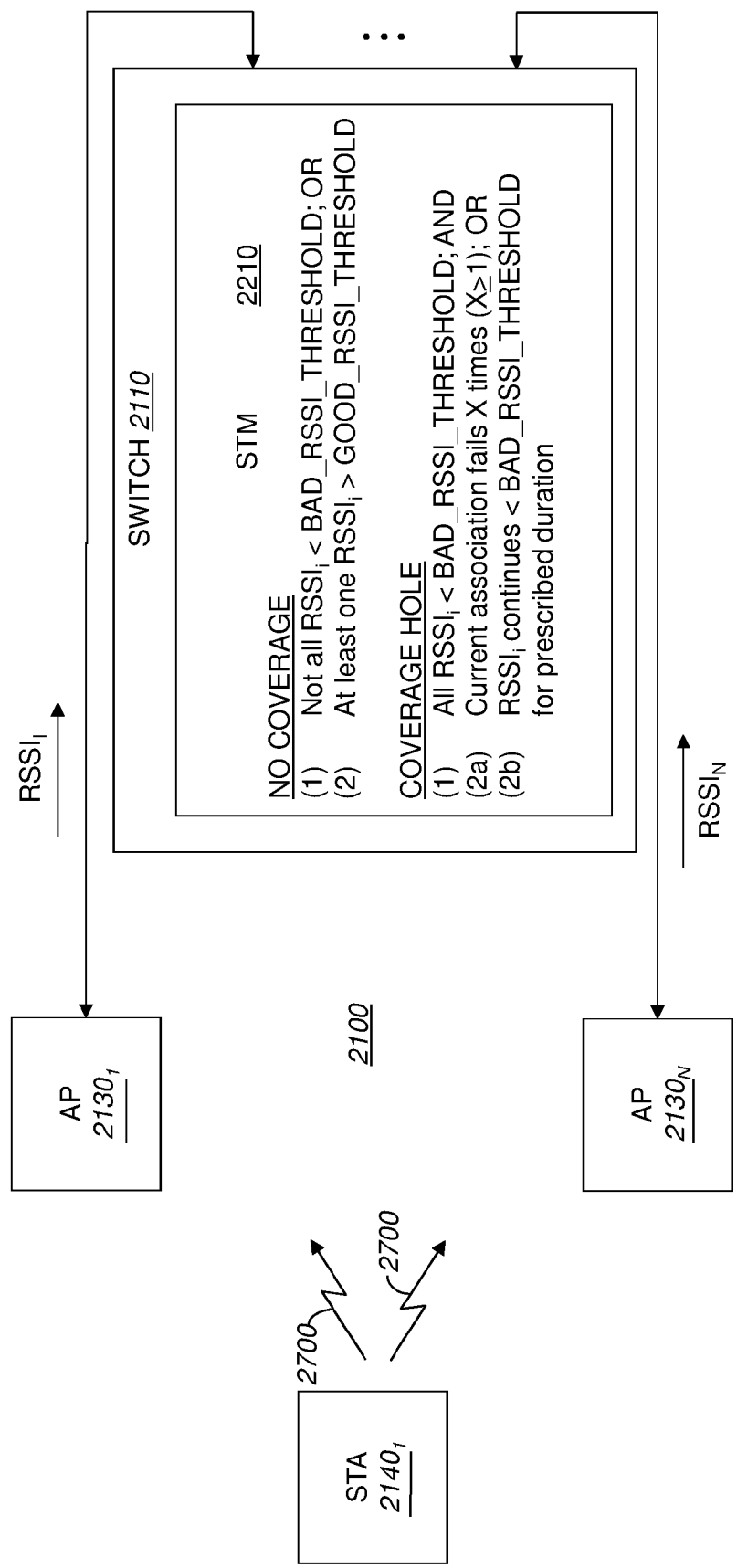
FIG. 8 is an exemplary embodiment of a wireless network switch operating in cooperation with an Access Point (AP) to detect coverage holes over a site.

Referring now to FIG. 8, an exemplary embodiment of a wireless network switch operating in cooperation with an Access Point (AP) to detect coverage holes over a wireless network 2100 is shown. A "coverage hole" is a location where a STA cannot associate with any AP. Centralized station management logic allows for the wireless network to discover coverage holes and to automatically perform events to eliminate or substantially reduce discovered coverage holes. Examples of such events include, but are not limited or restricted to (1) increasing transmission power for selected APs or (2) notifying a network administrator regarding the coverage hole.

As shown in FIG. 8, wireless network 2100 comprises wireless network switch 2110, one or more access points (e.g., AP $2130_1$, ..., AP $2130_N$) and one or more wireless stations (e.g., STA $2140_1$). Station management logic (STM) 2210, implemented within wireless network switch 2110, provides centralized control for management messages received from each AP $2130_1$-$2130_N$ during an Association phase with STA $2140_1$. In particular, each AP $2130_1$-$2130_N$ measures the RSSI value for a received management frame 2700 and provides the RSSI value to STM 2210.

According to this embodiment, two RSSI thresholds are used to determine the presence of a coverage hole. These thresholds may be static in nature (e.g., set in one-time programmable memory of wireless network switch 2110) or may be dynamic in nature (e.g., set by a network administrator in memory of wireless network switch 2110). A first RSSI threshold (referred to as "Good_RSSI_Threshold") indicates that STA $2140_1$ is not in a coverage hole if any AP $2130_1$, ..., or $2130_N$ detects an RSSI value more than Good_RSSI_Threshold for any message from STA $2140_1$. A second RSSI threshold (referred to as "Bad_RSSI_Threshold") indicates that that STA $2140_1$ may be in a coverage hole if all APs $2130_1$-$2130_N$ detect an RSSI value below Bad_RSSI_Threshold during message broadcasts from STA $2140_1$ during the Association phase. As illustrative examples, Good_RSSI_Threshold may be set to approximately 20 dbm0 while Bad_RSSI_Threshold may be set to approximately 10 dbm0.

In summary, during the Association phase, wireless communications by STA $2140_1$ are monitored. If none of APs $2130_1$-$2130_N$ detects an RSSI value for a management message above Bad_RSSI_Threshold, STM 2210 adds STA $2140_1$ to a potential coverage hole list. Thereafter, if STA $2140_1$ either fails to complete association with an AP or consistently provides messages with RSSI values below Bad_RSSI_Threshold to the associated AP, STA $2140_1$ is determined to be in a coverage hole. Namely, the placement of STA $2140_1$ within an entry of the potential coverage hole list causes STM 2210 to perform events to mitigate or eliminate the potential coverage hole.

Upon receiving a management frame, which originates from STA $2140_1$ and indicates an RSSI value above Good_RSSI_Threshold, STM 2210 removes STA $2140_1$ from an entry of the potential coverage hole list.

Figure 9:
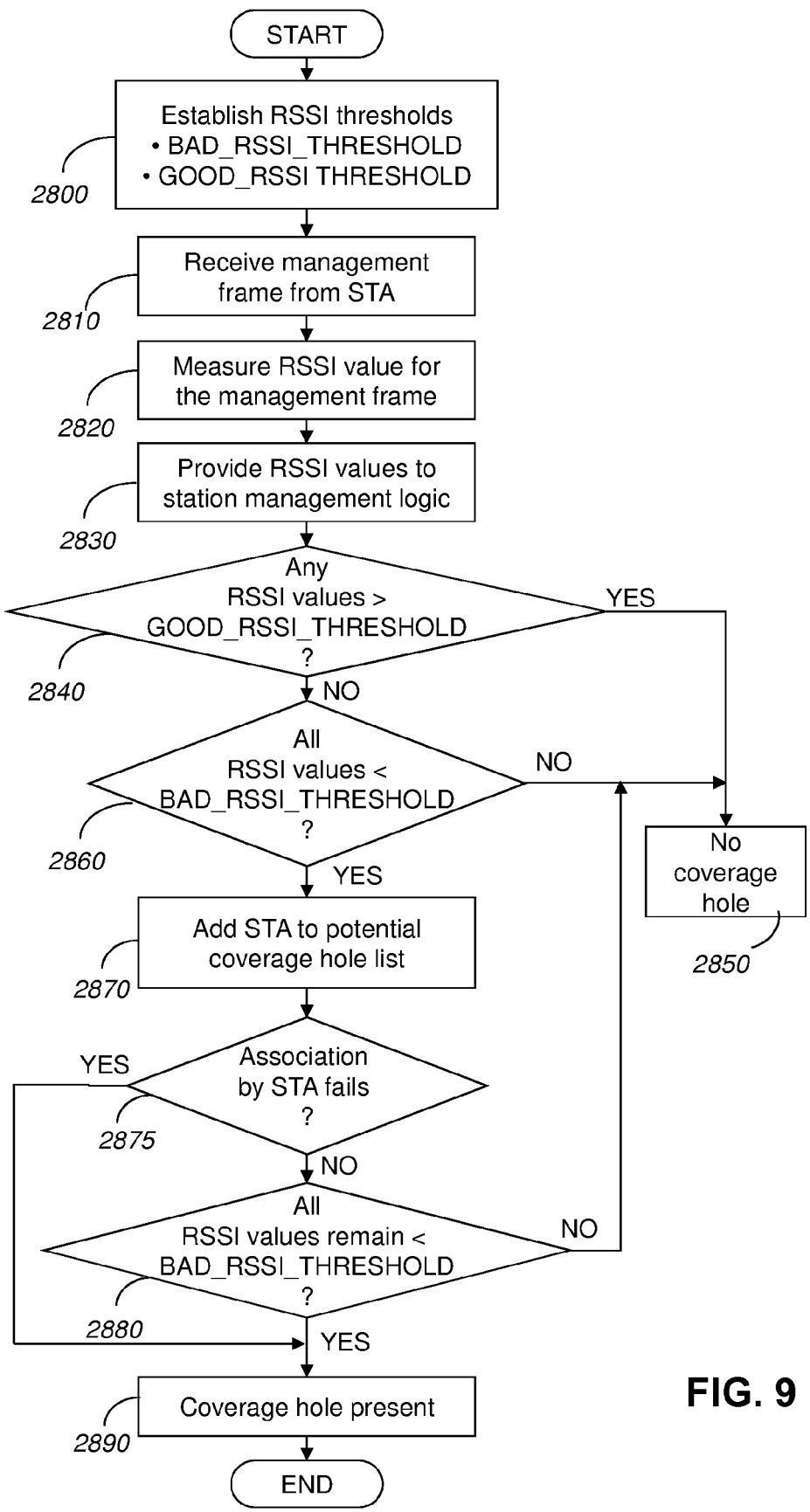
FIG. 9 is an exemplary embodiment of a method of operation of the wireless network switch for detecting coverage holes.

Referring to FIG. 9, an exemplary embodiment of a method of operation of the wireless network switch for detecting coverage holes is shown. Initially, a plurality of RSSI thresholds are established (operation 2800). These "thresholds," namely Good_RSSI_Threshold and Bad_RSSI_Threshold, are used to determine the presence of a coverage hole. Upon receipt of broadcasted management frames from the monitored STA, each AP measures the RSSI value for the management frame and provides the RSSI value to the station management logic "STM" (operations 2810, 2820 and 2830). Based on the RSSI values from the APs, the STM determines whether any of these RSSI values are greater than Good_RSSI_Threshold (operation 2840). If so, there is no coverage hole at the location of the monitored STA (operation 2850).

Furthermore, based on the RSSI values from the APs, the station management logic determines whether all of the APs detect an RSSI value below Bad_RSSI_Threshold (operation 2860). If so, the station management logic adds the monitored STA to a potential coverage hole list (operation 2870). Thereafter, if the monitored STA either fails to complete association with an AP or consistently provides messages with RSSI values below Bad_RSSI_Threshold to the associated AP, the monitored STA is determined to be in a coverage hole (operations 2875 and 2880). This causes the station management logic to initiate events to mitigate or eliminate such coverage holes (operation 2890).

V. Broadcast & Multicast Traffic Reduction

Figure 10:
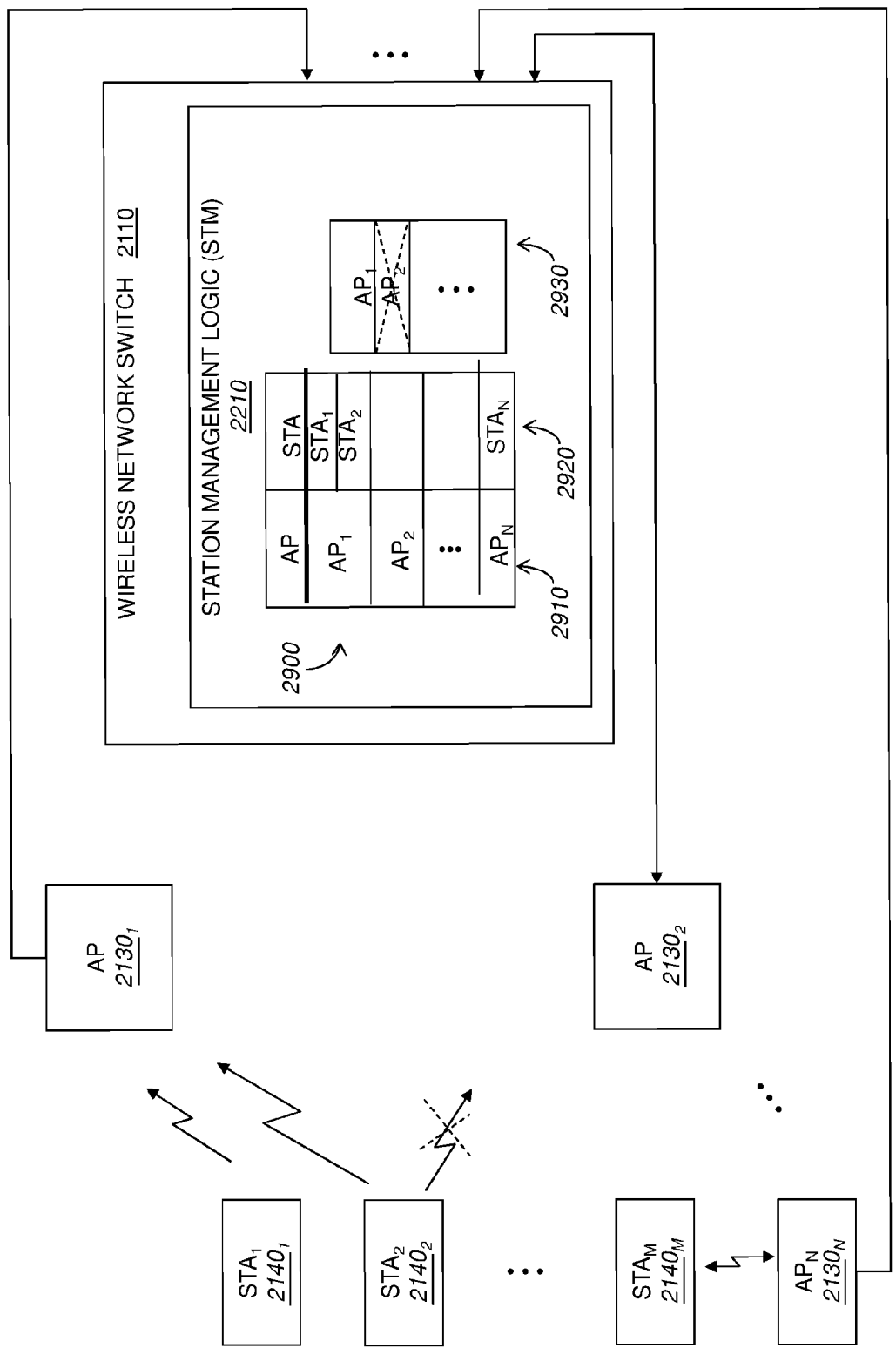
FIG. 10 is an exemplary embodiment of a method of operation of the wireless network switch for limiting broadcast and/or multicast traffic over an Access Point (AP).

Referring to FIG. 10, an exemplary embodiment of a method of operation of the wireless network switch for limiting broadcast and/or multicast traffic over an AP is shown. Herein, station management logic (STM) 2210 has knowledge of all STAs $2140_1$-$2140_M$ associated with all APs $2130_1$-$2130_N$ in wireless network 2100. Namely, STM 2210 maintains an AP-STA table 2900 to identify which STAs are associated with which APs. According to one embodiment, AP-STA table 2900 comprises MAC addresses 2910 for APs $2130_1$-$2130_N$ and MAC addresses 2920 of STAs $2140i$, ..., and/or $2140j$ associated with each AP $2130_1$, ..., or $2130_N$.

According to one embodiment of the invention, after a STA associates or disassociates with an AP, AP-STA table 2900 is updated. Herein, the MAC address for the newly associated STA is added to AP-STA table 2900 after the Association phase has completed. Likewise, a newly disassociated STA is removed from AP-STA table 2900.

In addition, after an update, STM 2210 determines whether an AP (e.g., AP $2130_2$) now has no STAs associated therewith. If so, STM 2210 removes the MAC address of AP $2130_2$ from a multicast group list 2930 stored within wireless network switch 2110. Since multicast group list 2930 is accessed by wireless network switch 2110 to determine the targeted destinations for multicast and broadcast transmissions, AP $2130_2$ would discontinue sending any broadcast or multicast messages until at least one STA becomes associated with AP $2130_2$. Once a STA becomes associated with AP $2130_2$, STM 2210 adds the MAC address of AP $2130_2$ back to multicast group list 2930.

VI. Radio Frequency Neighborhood Detection

Figure 11:
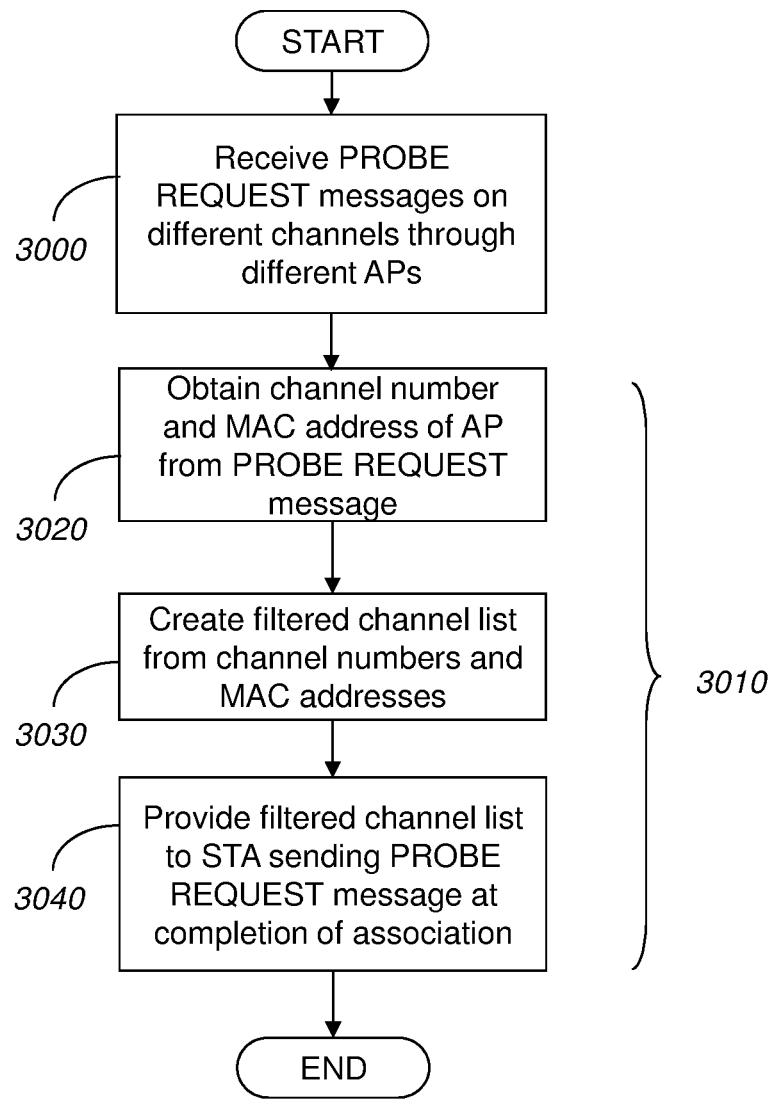
FIG. 11 is an exemplary embodiment of a method of operation of the wireless network switch for RF neighborhood detection.

Referring to FIG. 11, an exemplary embodiment of a method of operation of the wireless network switch for RF neighborhood detection is shown. According to one embodiment of the invention, a wireless network switch receives PROBE REQUEST messages on different channels through different APs (operation 3000). These PROBE REQUEST messages originate from the same STA.

Upon receipt, the wireless network switch dynamically computes RF neighborhoods of all APs deployed (operation 3010). According to one embodiment of the invention, a channel number and a MAC address associated with the AP is included as information within the PROBE REQUEST message (operation 3020). The wireless network switch creates a filtered channel list, which includes the MAC address of the AP and channel number extracted from PROBE REQUEST messages (operation 3030). The filtered channel list is provided to the STA at completion of its association, such as in an ASSOCIATION RESPONSE message for example (operation 3040). This enables the STA to use this filtered channel list to make more efficient mobility decision in future associations.

Communication Band Channels

WLAN devices, such as access points, use one or more radios and their antennas to send and receive the radio waves, and make small changes to the waves to encode data. WLAN radio waves have a repeating signal that, when graphed over time, shows a repeating periodic waveform characterized by a frequency (the number of times the waveform repeats per second), an amplitude (the height of the waveform), and a phase (the particular point in the repeating waveform). Because many electronic devices radiate energy at varying frequencies, to prevent the energy radiated by one device from interfering with other devices, government agencies (e.g., Federal Communications Commission of the United States, hereinafter "FCC") often enact regulations on the usage of radio frequencies. A frequency band typically refers to a range of consecutive frequencies. The wider the range of frequencies in a frequency band, the greater the amount of data that can be sent in that frequency band.

Table 1 below illustrates 2.4 GHz communication band, which includes eleven commonly used band channels in the United States. The first communication channel corresponds to a frequency spectrum from 2.402 GHz to 2.422 GHz with a mid-point frequency of 2.412 GHz. The second communication channel overlaps with the first communication channel, and corresponds to a mid-point frequency of 2.417 GHz. Likewise the third communication channel overlaps with both the first and the second communication channels with an even higher mid-point frequency.

TABLE 1

2.4 GHz band channels unlicensed in the US

| | Channel | | | | | |
|---|---|---|---|---|---|---|
| | 1 | 2 | 3 | 4 | 5 | 6 |
| Frequency (GHz) | 2.412 | 2.417 | 2.422 | 2.427 | 2.432 | 2.437 |

| | Channel | | | | |
|---|---|---|---|---|---|
| | 7 | 8 | 9 | 10 | 11 |
| Frequency (GHz) | 2.442 | 2.447 | 2.452 | 2.457 | 2.462 |

There are only three non-overlapping channels in the 2.4 GHz communication band. The three non-overlapping channels are channels 1, 6, and 11. Thus, in a WLAN that operates on the 2.4 GHz communication band, access points are typically configured to transmit data within one of the three non-overlapping channels to reduce interference and to improve transmission quality.

Table 2 below illustrates mid-point frequencies of the twenty-four commonly used channels in the 5 GHz communication band in the United States.

TABLE 2

5 GHz band channels unlicensed in the US

| Channel | Frequency (GHz) |
|---|---|
| 36 | 5.180 |
| 40 | 5.200 |
| 44 | 5.220 |
| 48 | 5.240 |
| 52 | 5.260 |

TABLE 2-continued

5 GHz band channels unlicensed in the US

| Channel | Frequency (GHz) |
|---|---|
| 56 | 5.280 |
| 60 | 5.300 |
| 64 | 5.320 |
| 100 | 5.500 |
| 104 | 5.520 |
| 108 | 5.540 |
| 112 | 5.560 |
| 116 | 5.580 |
| 136 | 5.680 |
| 140 | 5.700 |
| 149 | 5.745 |
| 153 | 5.765 |
| 157 | 5.785 |
| 161 | 5.805 |
| 165 | 5.825 |

Therefore, 5 GHz communication bands have more non-overlapping communication channels compared to 2.4 GHz communication bands, which implies less radio congestion and RF interference in the 5 GHz communication bands than in the 2.4 GHz communication band. Moreover, operating at the 5 GHz communication bands is advantageous over operating at the 2.4 GHz communication bands also because the 5 GHz communication bands offer better penetration, better scatter, little abnormal adsorption by water or damp, and possibility of orthogonal frequency-division multiplexing (OFDM) over the entire speed range, and so on.

Identification of Devices Capable of Communicating on Multiple Bands

Given the advantages of different communication bands described above, many wireless client devices now provides capability of communicating on multiple communication bands. For example, some client devices may be equipped with multiple radio antennas that are configured to communicate on both 2.4 GHz and 5 GHz communication bands. Identifying such client devices facilitates guiding the client devices to communicate on a preferred communication band, thereby achieving higher throughput and better quality of connections to the wireless network.

It shall be noted, however, that the preferred communication band from a wireless network client's perspective may be different from the preferred communication band from a wireless network system's perspective. For example, wireless network users often prefer to select a wireless local area network ("WLAN") whose service set identifier ("SSID") is associated with strong wireless response signals. Nevertheless, signal strength is merely one of many factors that may affect wireless connectivity. Other factors can also affect the wireless connectivity for wireless client devices. Such factors may include RF interferences from other electronic devices located within the wireless coverage area, mixture of 802.11b/g network connections with 802.11n network connections, shared bandwidth among multiple users, and so on. It can often be difficult for a wireless client device to acquire knowledge regarding these factors. For example, a wireless user may not know how many other users are presently connecting to a WLAN that is associated with the strongest signal strength. Likewise, a wireless user may not know whether a WLAN associated with strong wireless response signals has recently experienced jitters due to, e.g., intermittent RF interferences. Moreover, a wireless user is unlikely to know whether a WLAN associated with strong wireless response signals is configured to operate in a mixed mode that supports both 802.11b/g network connections and 802.11n network connections. Even for an 802.11n wireless network, a wireless user may not know whether the wireless network is configured to support features, such as channel bounding, in order to maximize the throughput.

Knowledge of the above-described factors, which may impact a wireless client's connectivity and a wireless network's performance, typically can be observed and/or acquired by the wireless network system, for example, at an access point or a wireless controller. Thus, the wireless network system may determine, based on system knowledge about the wireless network which is unknown to the wireless client, that a different communication band, which is not the preferred communication band determined by a wireless client, shall be the preferred communication band for communication with the wireless client. For example, the wireless network system may observe that too many wireless users and/or devices are connected on the 2.4 GHz communication band, and thereby determine that 5 GHz communication band would be a preferred communication band, even though the wireless signals received from a wireless client is slightly weaker on the 5 GHz communication band than the 2.4 GHz communication band.

If a wireless network system can successfully identify client devices that are capable of communicating on the system's preferred communication band, which is different from the client device's preferred communication band, then the wireless network system can guide those client devices to communicate on the system's preferred communication band instead of the client's preferred communication band.

In one embodiment, the wireless network system can identify such client devices by keeping track of their MAC addresses when a wireless signal (for example, a PROBE request) is received on the system's preferred communication band. An MAC address is a unique identifier assigned to network interfaces for communications on the physical network segment. Because each MAC address uniquely identifies a network interface card ("NIC") in a client device, the MAC address also uniquely identifies a client device even though the client device may have multiple NICs.

In particular, according to one embodiment of the present disclosure, the system generates and maintains a list in, for example, a memory of an access point, a switch, a network controller, or other kinds of network device. Assuming, for illustration purposes, that 5 GHz communication band is determined to be the system's preferred communication band, when the system receives a Probe Request from a client device on the 5 GHz communication band, the system retrieves the MAC address associated with the client device from the received Probe Request. The system then checks the list to determine whether the retrieved MAC address exists in the list. If so, the system has previously identified the client device as capable of communicating on the system's preferred communication band, and thus will proceed with determining whether to respond or ignore the Probe Request. If, however, the retrieved MAC address from the Probe Request received on the 5 GHz communication band does not exist in the list, the system includes the MAC address to the list, thereby identifying the client device as capable of communicating on the system's preferred communication band, which is assumed by the system to be different from the client's preferred communication band based on the strength of wireless signals received by the system from the client device.

In some embodiments, the system may enhance the list by also tracking the MAC addresses of client devices capable of communicating on, for example, the wireless client's preferred communication bands, or the system's non-preferred communication bands, etc. In one embodiment, the system may generate a separate MAC address list for each communication band. In another embodiment, the system may generate one or more MAC address list, including different fields, each of which corresponds to a specific communication band.

In some embodiments, the system may additionally include a timestamp for each MAC address. The timestamp maybe corresponds to, for example, the latest Probe Request received on the system's preferred communication bands, on the wireless client's preferred communication bands, on the system's non-preferred communication bands, and/or on the wireless client's non-preferred communication bands, etc.

In some embodiments, the system may further include a signal strength corresponding to the each MAC address. The signal strength can be associated with, e.g., a signal-to-noise ratio ("SNR") or a dynamic range. SNR is generally defined as the power ratio between a signal (meaningful information) and the background noise (unwanted signal). Note that SNR typically measures the ratio between an arbitrary signal level (not necessarily the most powerful signal possible) and noise. On the other hand, dynamic range generally measures the ratio between the strongest un-distorted signal on a channel and the minimum discernable signal, which for most purposes is the noise level.

In some embodiments, SNR can be measured by received signal strength indicator ("RSSI"), which is an indication of the power level being received by the antenna as sampled during the preamble stage of receiving a wireless data frame. In other embodiments, received channel power indicator ("RCPI") is used to indicate the signal strength. RCPI is a functional measurement covering the entire received frame with defined absolute levels of accuracy and resolution.

FIG. 12 shows a diagram illustrating an example of MAC address list according to one embodiment of the present disclosure. In the illustrated example, MAC list 3200 includes MAC addresses 3210 associated with multiple wireless client devices, timestamp of last received Probe Request 3220, SNR of last received Probe Request 3230, a field indicating whether a client device associated with the MAC address is capable of communicating on the system's preferred communication band (such as 5 GHz communication band) 3240, and another field indicating whether the client device is capable of communicating on the system's non-preferred communication band (such as 2.4 GHz communication band) 3250. Note that MAC list 3200 may include other fields to facilitate tracking the client devices' capabilities, preferences, network environments, and so on, without departing from the spirit of the instant disclosure. Also, MAC list 3200 may omit one or more illustrated fields for some or all of the MAC addresses. FIG. 12 is hereby presented for illustrated purposes only and shall not be construed to limit the structure or content of MAC list 3200.

In the example illustrated in FIG. 12, wireless client device 3262 is associated with an MAC address of 00:13:ce:3e:60:bc, and received its latest Probe Request on 2.4 GHz communication band on April 15 21:25:28. The system can also determine from MAC list 3200 that the latest Probe Request received from wireless client device 3262 has good signals, because its SNR value is 20 dB, which falls in a pre-determined signal strength range for good signals on the 2.4 GHz communication band. Likewise, wireless client device 3264 is associated with an MAC address of 00:04:13:21:04:54, and received its latest Probe Request on 5 GHz communication band on April 15 21:27:32. Wireless client device 3264 has good signals, because its SNR value 35 dB may correspond to a pre-determined range for good signals on the 5 GHz communication band. Note that the ranges for the same level of signal strength may be the same or different on different communication bands. For example, signals with an SNR value of 20 dB may be considered as good on the 2.4 GHz communication band, but as poor signals on the 5 GHz communication band.

As another example, wireless client device 3266, which is associated with an MAC address of 00:0b:86:40:14:e0, has been identified as capable of communicating on both the 2.4 GHz and the 5 GHz communication bands. The latest Probe Request was received from wireless client device 3266 on April 15 21:27:32 with an SNR value of 15 dB. MAC list 3200 may further include information that associate the latest received Probe Request with the 2.4 GHz communication band. Such information may be included within SNR field 3240, timestamp field 3230, or an additional field in MAC list 3200. Based on information about wireless client device 3266 in MAC list 3200, the system may determine not to guide wireless client device 3266 to the system's preferred communication band (such as the 5 GHz communication band), because the system may infer that wireless client device 3266 could receive even weaker signals on the 5 GHz communication band than on the 2.4 GHz communication band.

As a further example, wireless client device 3268, which is associated with an MAC address of 00:0b:86:6f4:c7:ae, also has been identified as capable of communicating on both the 2.4 GHz and the 5 GHz communication bands. Because the latest Probe Request was received from wireless client device 3268 on April 15 21:32:07 with an SNR value of 40 dB on 2.4 GHz communication band, the system may infer that wireless client device 3268 will receive reasonably good signals on the 5 GHz communication band as well. Therefore, the system will operate to guide wireless client device 3268 from the client's preferred communication band to the system's preferred communication band.

Note that the example provided herein is by way of illustration only. Other implementations of tracking and storing information may be used to accomplish the objective.

Band Steering to Preferred Communication Band

Figure 13A:
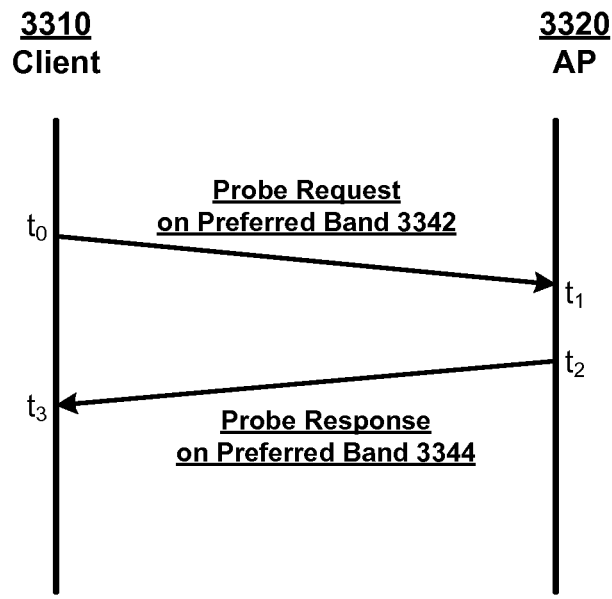
FIG. 13A-13C are sequence diagrams illustrating band steering for multiple-band wireless clients according to various embodiments of the present disclosure.
Figure 13B:
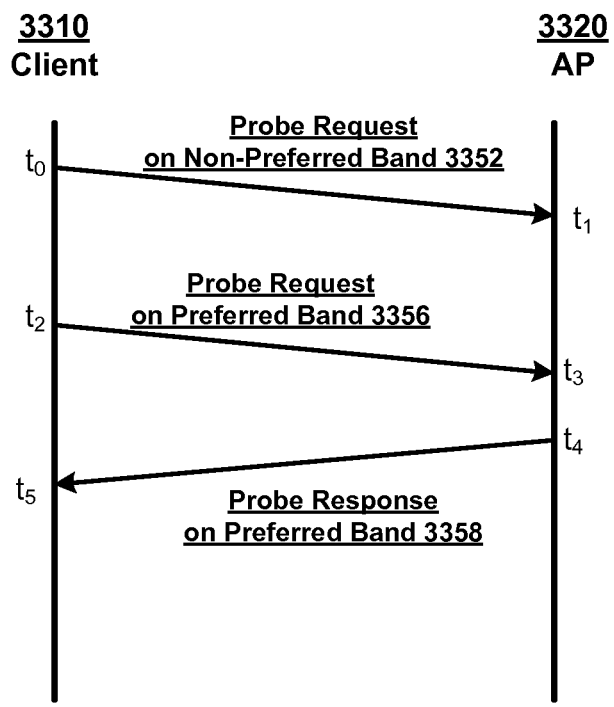

FIGS. 13A-14C are sequence diagrams illustrating band steering for multiple-band wireless clients according to various embodiments of the present disclosure. Communication exchanges in WLAN as illustrated in FIGS. 13A-13C typically involve two parties: client 3310 and access point ("AP") 3320. Note that access point 3320 can be substituted by a controller, a switch, or any other network device, which is coupled to client 3310 through a network, and which is capable of establishing an association with client 3310 via receiving and responding to Probe requests from client 3310. Also, it is contemplated that the disclosure describes an analysis based on receipt of a Probe request, although it is contemplated that this analysis may be conducted for any wireless signaling that requests return signaling.

Specifically, FIG. 13A illustrates a sequence diagram in which access point 3320 receives a wireless signal, such as a Probe Request for example, on a system's preferred communication band 3342 from client 3310. During operations, client 3310 initiates a Probe Request 3342 at time $t_0$. Probe Request 3342 is received by AP 3320 at time $t_1$. After receiving Probe Request 3342 at time $t_1$, AP 3320 determines whether Probe Request 3342 is received in a channel on the system's preferred communication band. In the illustrated example, because Probe Request 3342 is received on the system's preferred communication band, AP 3320 transmits a responsive signal, such as a Probe Response 3344 for example, on the system's preferred communication band at time $t_2$. Probe Response 3344 on the system's preferred communication band is received by client 3310 at time $t_3$, subsequent to which WLAN coupled to AP 3320 will become visible to client 3310 for association.

Figure 3:
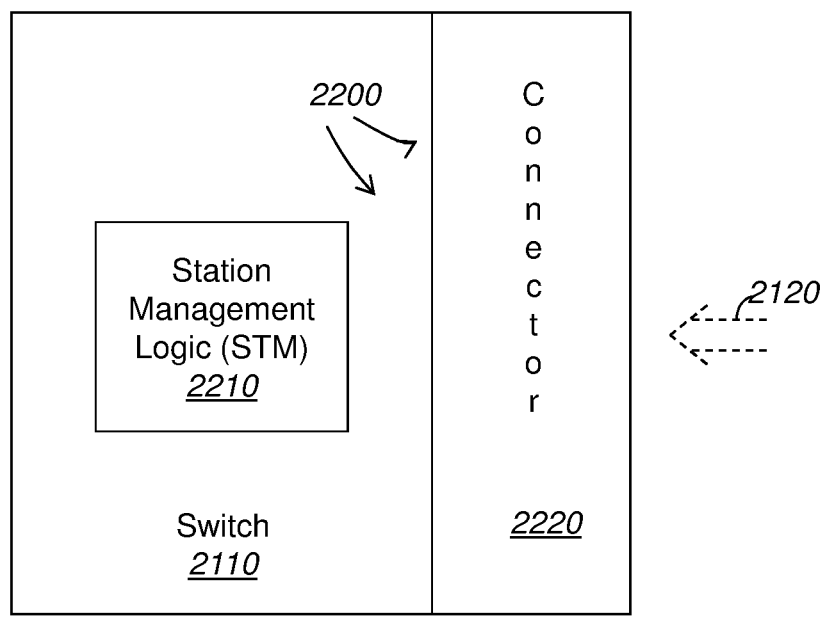
FIG. 3 is an exemplary embodiment of a wireless network switch.

FIG. 3B illustrates a sequence diagram in which access point ("AP") 3320 receives a Probe request 3352 on a non-preferred communication band from client 1310 at $t_1$. During operations, at time $t_0$, client 3310 transmits a Probe Request 3352 on a client's preferred communication band, which is a system's non-preferred communication band, to AP 3320. Because client 3310 has been identified as capable of communicating on the system's preferred communication band, after AP 3320 receives Probe Request 3352 at time $t_1$, the system will ignore Probe Request 3352, and thereby guiding client 3310 to transmit another Probe Request on the system's preferred communication band instead of the client's preferred communication band. In this example, client 3310 transmits a Probe Request 3356 on the system's preferred communication band at time $t_2$, which is received by AP 3320 at time $t_3$. In response, at time $t_4$, AP 3320 transmits Probe Response 3358 on the preferred communication band to client 3310, and Probe Response 3358 is received by client 3310 at time $t_5$.

Figure 13C:
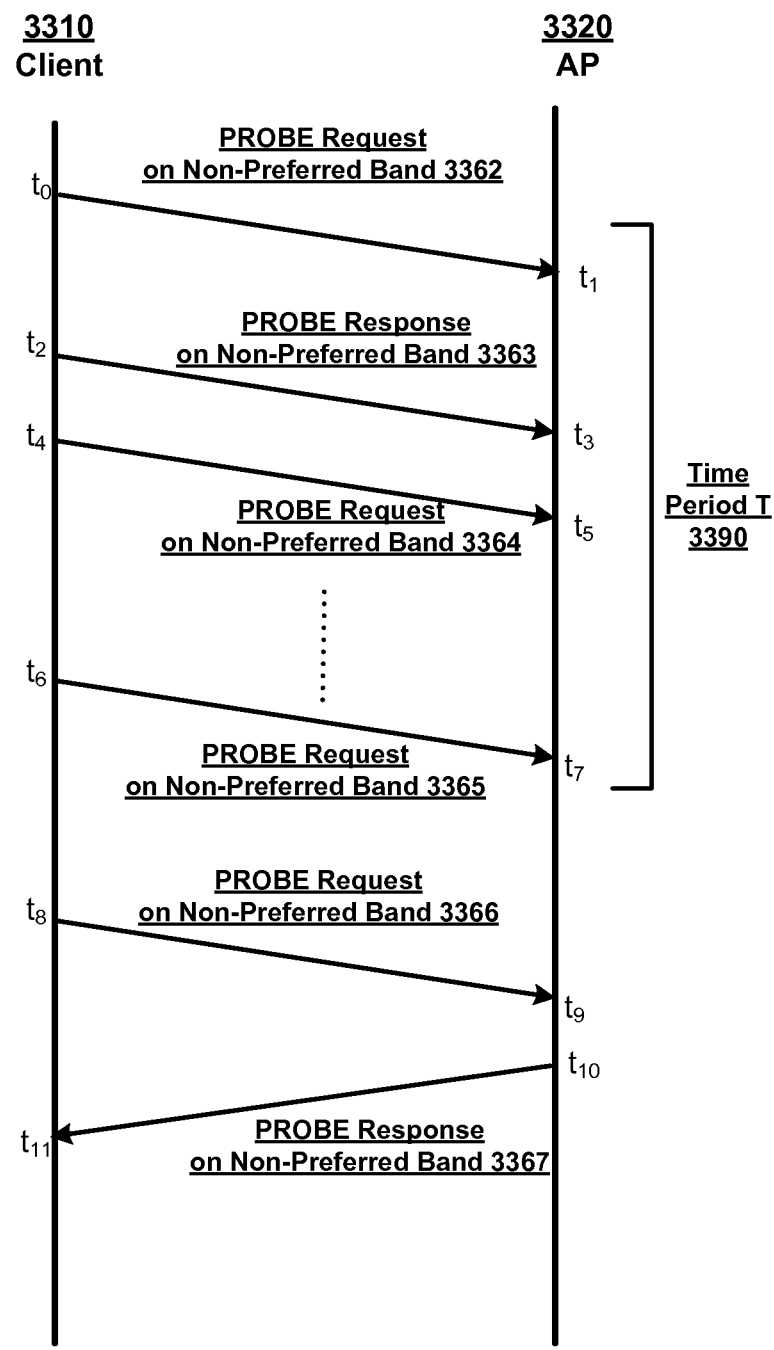

FIG. 13C illustrates a sequence diagram in which access point ("AP") 3320 receives multiple Probe Requests 3362-3365 on a system's non-preferred communication band from client 3310 within a pre-determined time period T 3390. During operations, at time $t_0$, client 3310 transmits a Probe Request 3362 on a system's non-preferred communication band (or a client's preferred communication band) to AP 3320. Probe Request 3362 is received by AP 3320 at time $t_1$. Because client 3310 has been identified as capable of communicating on the system's preferred communication band, after AP 3320 receives Probe Request 3352 at time $t_1$, the system will ignore Probe Request 3352, and thereby guiding client 3310 to transmit another Probe Request on the system's preferred communication band instead of the client's preferred communication band.

However, in this example, client 3310 subsequently transmits multiple Probe Requests on the system's non-preferred communication band, such as, Probe Request 3363 which is transmitted by client 3320 at time $t_2$ and received by AP 3320 at time $t_3$, Probe Request 3364 which is transmitted by client 3320 at time $t_4$ and received by AP 3320 at time $t_5$, ... Probe Request 3365 which is transmitted by client 3320 at time $t_6$ and received by AP 3320 at time $t_7$. In one embodiment, because AP 3320 receives multiple Probe Requests 3363-3365 on the system's non-preferred communication band without receiving any request on the system's preferred communication band during a pre-determined time period T 3390, the system infers that client 3310 is persistent on the client's preferred communication band. This can happen, for example, when a client device that is capable of communicating on multiple communication bands has a broken radio antenna that is used to communicate on the system's preferred communication channel. Other client-specific circumstances may also necessitate the client's need to be persistent on communicating on the client's preferred communication band instead of the system's communication band. Therefore, according to one embodiment, after pre-determined time period T 3390 has lapsed, if client 3310 continues to transmit Probe Request (e.g., Probe Request 3366 which is transmitted by client 3310 at time $t_8$ and received by AP 3320 at time $t_9$) on the system's non-preferred communication band, the system will transmit a Probe Response (e.g., Probe Response 3367 which is transmitted by AP 3320 at time $t_{10}$ and received by client 3310 at time $t_{11}$) on the system's non-preferred communication band.

In another embodiment, the system infers that client 3310 is persistent on the client's preferred communication band if AP 3320 receives more than a threshold number of Probe Requests (e.g., Probe Requests 3363-3365) on the system's non-preferred communication band without receiving any Probe Request on the system's preferred communication band. In yet another embodiment, the system draws the inference that client 3310 is persistent on the client's preferred communication band if AP 3320 receives more than a threshold number of Probe Requests within a pre-determined threshold time period T without receiving any Probe Request on the system's preferred communication band.

Moreover, the threshold time period or the threshold number of Probe Requests is determined prior to receiving the Probe Requests, but can be either statically or dynamically determined based on factors, such as network interference level and/or stability, clients' roaming profile and/or mobility, etc. In one embodiment, the disclosed system can adjust to a shorter threshold time period, or a lower threshold number of Probe Requests, when more mobile client devices are observed in the WLAN. In another embodiment, the disclosed system can adjust to a shorter threshold time period, or a lower threshold number of Probe Requests, when the WLAN is regarded as relatively unstable due to RF interferences or other reasons.

Also, note that the threshold time period and/or number corresponding to different communication bands may be different. Moreover, the threshold time period and/or number may depend on the type of communications. Further, threshold time period and/or number can be configurable by a network administrator, or can be dynamically adjusted based on network and/or wireless client profiles.

Band Steering Process

Figure 14:
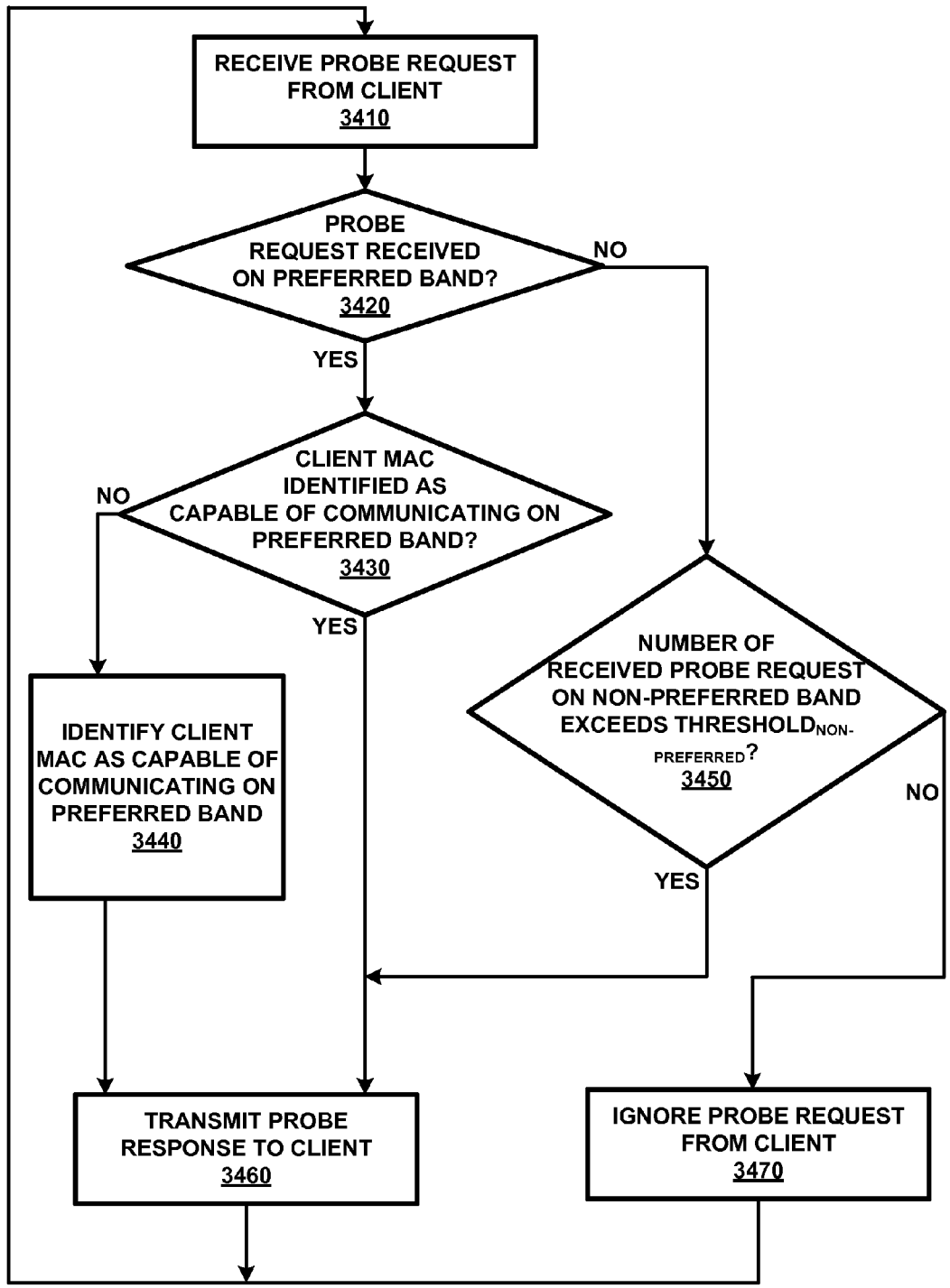
FIG. 14 is a flowchart illustrating the process of band steering for multiple-band wireless clients according to embodiments of the present disclosure.

FIG. 14 is a flowchart illustrating the process of band steering for multiple-band wireless clients according to embodiments of the present disclosure. During operations, the disclosed system receives a wireless signal (e.g., a Probe Request) from a client in a WLAN (operation 3410). The system then determines whether the Probe Request is received on a system's preferred communication band (operation 3420). If so, the system further determines whether the client's corresponding MAC address has been identified as capable of communicating on the system's preferred band (operation 3430). As described above in reference to FIG. 12, the system can identify such MAC addresses through looking up an MAC address list that includes MAC addresses associated with client devices from which at least one previous request on the system's preferred communication band has been received. Next, the system transmits a wireless return signal (e.g., a Probe Response) on the system's preferred communication to client (operation 3460).

On the other hand, if the client's corresponding MAC address has not been identified as capable of communicating on the system's preferred communication band, the system will identify the MAC address (operation 3440) accordingly after receiving the Probe Request on the system's preferred communication band. According to one embodiment, the system makes the identification by including the client's MAC address in an MAC address list, which contains MAC addresses corresponding to devices that have been identified based on previously received wireless request signals.

In one embodiment, if a Probe Request is received on the system's non-preferred communication band, the system next determines whether the number of received Probe Requests on the system's non-preferred communication band time exceeds a pre-determined threshold number for the corresponding non-preferred communication band (operation 3450). In one embodiment, the system further determines that no Probe Request has been received on the system's preferred communication band while receiving the Probe Requests on the system's non-preferred communication band. If so, the system will transmit a wireless return signal (e.g., a Probe Response) to the client (operation 3460). Otherwise, the system will ignore the Probe Request from the client (operation 3470), thereby guiding the client to transmit a Probe Request on the system's preferred communication band instead of the client's preferred communication band.

In another embodiment, after receiving a number of Probe Requests on the system's non-preferred communication band without receiving any Probe Requests on the system's preferred communication band, the system determines whether a pre-determined threshold time period has lapsed (not shown). If so, the system will transmit a wireless return signal (e.g., a Probe Response) to the client (operation 3460). Otherwise, the system will ignore the Probe Request from the client (operation 3470), thereby guiding the client to transmit a Probe Request on the system's preferred communication band instead of the client's preferred communication band.

In another embodiment, the system determines whether a pre-determined threshold number of Probe Requests on the system's non-preferred communication band have been received within a pre-determined threshold time period without receiving any Probe Request on the system's preferred communication band (not shown). If so, the system will transmit a wireless return signal (e.g., a Probe Response) to the client (operation 3460). Otherwise, the system will ignore the Probe Request from the client (operation 3470), thereby guiding the client to transmit a Probe Request on the system's preferred communication band instead of the client's preferred communication band.

In some embodiments, the threshold time period and/or the threshold number of wireless request signals (e.g., Probe Requests) can be dynamically adjustable. In some embodiments, the threshold time period and/or the threshold number of wireless request signals (e.g., Probe Requests) are specific to each communication band. Thus, one system's non-preferred communication band may have different threshold values from another system's non-preferred communication band.

Band Steering System

Figure 15:
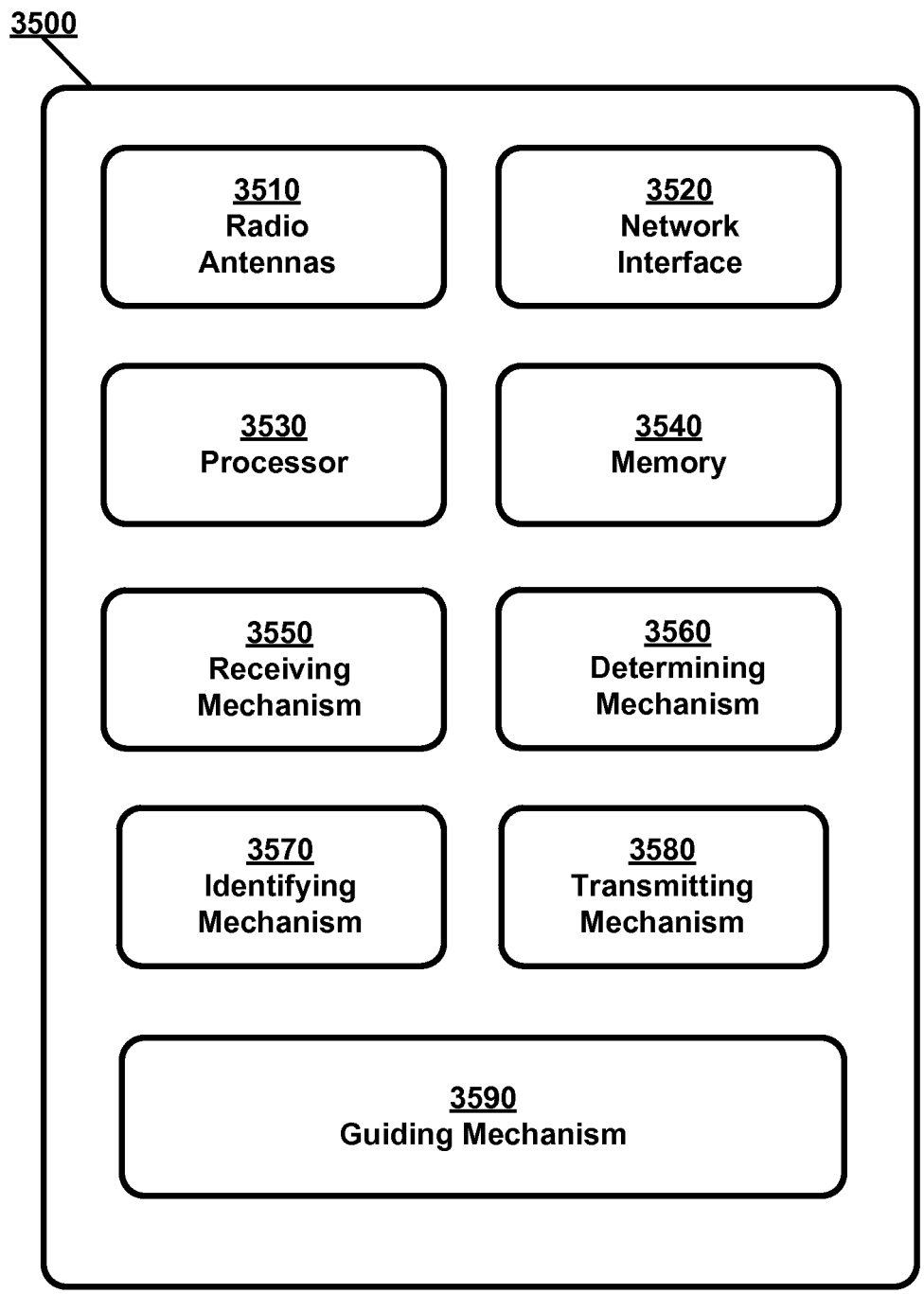
FIG. 15 is a block diagram illustrating a system for band steering for multiple-band wireless clients according to embodiments of the present disclosure.

FIG. 15 is a block diagram illustrating a system for band steering for multiple-band wireless clients according to embodiments of the present disclosure.

Network device 3500 includes at least one or more radio antennas 3510 capable of either transmitting or receiving radio signals or both, a processor 3530 capable of processing computing instructions, a network interface 3520 capable of communicating to a wired or wireless network, and a memory 3540 capable of storing instructions and data. Moreover, network device 3500 further includes a receiving mechanism 3550, a determining mechanism 3560, an identifying mechanism 3570, a transmitting mechanism 3580, and a guiding mechanism 3590, all of which are coupled to the processor and the memory in network device 3500. Network device 3500 may be used as a client system, or a server system, or may serve both as a client and a server in a distributed or a cloud networking system.

Radio 3510 may be any combination of known or convenient electrical components, including but not limited to, transistors, capacitors, resistors, multiplexers, wiring, registers, diodes or any other electrical components known or later become known.

Network interface 3520 can be any communication interface, which includes but is not limited to, a modem, token ring interface, Ethernet interface, wireless IEEE 802.11 interface, cellular wireless interface, satellite transmission interface, or any other interface for coupling network devices.

Processor 3530 can include one or more microprocessors and/or network processors. Memory 3540 can include storage components, such as, Dynamic Random Access Memory (DRAM), Static Random Access Memory (SRAM), etc. In one embodiment, memory 1540 stores a unique address identifier associated with a wireless client device in a list, which indicates wireless client devices in the wireless network that are capable of communicating on the first wireless communication band.

Receiving mechanism 3550 receives one or more wireless signals including requests, such as Probe Requests, as describe in the present disclosure.

Determining mechanism 3560 determines whether a wireless communication band is preferred by wireless network and/or wireless client devices. In one embodiment, determining mechanism 3560 determines that the wireless communication band is preferred by the wireless network based on network information known to the system. In another embodiment, determining mechanism 3560 determines that the wireless communication band is not preferred by the wireless network based on network information known to the system. Note that the network information known to the system may include mixed types of network connections, shared bandwidth, radio frequency interferences, wireless network traffic, wireless network latency, wireless network stability, etc. In one embodiment, determining mechanism 3560 determines that another wireless communication band is preferred by a wireless client device. Particularly, determining mechanism 3560 may determine that the wireless client is preferred by the wireless client device based in part on strength of signals received from the wireless client device. Moreover, in one embodiment, determining mechanism 3560 determines that the wireless communication band preferred by the wireless client device is different from the wireless communication band preferred by the wireless network.

Furthermore, in some embodiments, determining mechanism 3560 determines whether an identified unique address identifier already exists in the list. If not, in response, the unique address identifier is stored in the list.

In some variations of the embodiments, determining mechanism 3560 determines whether any request is received within a pre-determined threshold time period from a wireless client device on a wireless communication band that is preferred by the wireless network system. In some variations, determining mechanism 3560 determines whether any request is received from a wireless client device on a wireless communication band that is preferred by the wireless network system, before the number of requests received from the wireless client device on another wireless communication band that is preferred by the wireless client device exceeds a threshold number. In other variations, determining mechanism 3560 determines whether a pre-determined threshold number of requests on the client's preferred communication band are received within a pre-determined threshold time period during which no request is received on the system's preferred communication band.

Identifying mechanism 3570 identifies a unique address identifier associated with a wireless client device based on a request received from the client device.

Transmitting mechanism 3580 transmits a response to a request from a wireless client device. In some embodiments, transmitting mechanism 3580 transmits responses to clients on a system's preferred communication band. In other embodiments, transmitting mechanism 3580 transmits responses to clients on a system's non-preferred communication band. In some embodiments, transmitting mechanism 3580 transmits responses to clients on a wireless client device's preferred communication band. In other embodiments, transmitting mechanism 3580 transmits responses to clients on a wireless client device's non-preferred communication band.

Guiding mechanism 3590 guides wireless client devices capable of communicating on a system's preferred communication band to associate with the wireless network on the system's preferred communication band. In some embodiments, guiding mechanism 3590 ignores a request from the wireless client device received on another communication band that is not preferred by the wireless system. In one embodiment, guiding mechanism 3590 ignores a request from the wireless client device received on another communication band that is preferred by the wireless client device.

The present disclosure may be realized in hardware, software, or a combination of hardware and software. The present invention may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, a "logic" includes hardware and/or software module(s) that are configured to perform one or more functions.

As used herein, a "processor" is a logic that processes information. Examples of a processor include a microprocessor, an application specific integrated circuit, a digital signal processor, a micro-controller, a finite state machine, or even combinatorial logic.

As used herein, a "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

As used herein, an "interconnect" is generally defined as an information-carrying medium that establishes a communication pathway. The interconnect may be a wired interconnect, where the medium is a physical medium (e.g., electrical wire, optical fiber, cable, bus traces, etc.) or a wireless interconnect (e.g., air in combination with wireless signaling technology).

As used herein, the term "information" is defined as data, address, control or any combination thereof. For transmission, information may be transmitted as a message, namely a collection of bits in a predetermined format. One particular type of message is a frame including a header and a payload, each having a predetermined number of bits of information.

As used herein, the term "access point" (AP) generally refers to receiving points for any known or convenient wireless access technology which may later become known. Specifically, the term AP is not intended to be limited to 802.11 APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the invention has been described in terms of various embodiments, the invention should not be limited to only those embodiments described, but can be practiced with modification and alteration within the spirit and scope of the appended claims. The description is thus to be regarded as illustrative rather than limiting.

What is claimed is:

1. A method comprising:
   receiving, at a network device in a wireless network that includes a plurality of wireless communication bands including a first wireless communication band that is preferred by the wireless network and a second wireless communication band that is not preferred by the wireless network, a request from a wireless client device on the second wireless communication band, wherein the first wireless communication band is preferred by the wireless network based on network conditions known to the network device, the network conditions comprising at least network traffic information;
   identifying, by the network device, a unique Media Access Control (MAC) address associated with the wireless client device based on the request;
   determining, by the network device, whether the wireless client device is capable of communication on the first wireless communication band based on the unique MAC address identified from the request, and based on a timestamp and a signal strength associated with a prior connection between the wireless client device and an access point in the wireless network on the first wireless communication band; and
   in response to a determination that the wireless client device is capable of communication on the first wireless communication band, communicating, by the network device, with the wireless client device on the first wireless communication band.

2. The method of claim 1, wherein the network conditions are not known to the wireless client device.

3. The method of claim 1, further comprising:
   guiding wireless client devices capable of communicating on the first wireless communication band preferred by the wireless network to associate with the wireless network on the first wireless communication band.

4. The method of claim 3, wherein the first wireless communication band preferred by the wireless network is different from the second wireless communication band which is determined to be preferred by the wireless client device.

5. The method of claim 4, wherein the second wireless communication band preferred by the wireless client is determined based at least in part on strength of a signal received from the wireless client at the network device.

6. The method of claim 1, wherein the network conditions further comprise one or more of:
   mixed types of network connections;
   shared bandwidth;
   radio frequency interferences;
   wireless network latency; and
   wireless network stability.

7. The method of claim 1, further comprising:
   determining that a number of requests received from the wireless client device within a pre-determined time period on the second wireless communication band, which is not preferred by the wireless network, exceeds a threshold; and
   responding to the wireless client device on the second wireless communication band.

8. The method of claim 7, wherein the threshold or the predetermined time period is dynamically adjustable.

9. A network device in a wireless network comprising:
   a memory;
   a processor executing instructions stored in the memory;
   a receiving mechanism operating with the processor to receive a request from a wireless client device on a non-preferred wireless communication band, wherein the wireless network includes a preferred wireless communication band and the non-preferred wireless communication band based on network conditions known to the network device, the network conditions comprising at least network traffic information;
   an identifying mechanism operating with the processor to identify a unique Media Access Control (MAC) address associated with the wireless client device based on the request;
   a determining mechanism operating with the processor to determine whether the wireless client device is capable of communicating on the preferred wireless communication band based on the unique MAC address identified from the request, and based on a timestamp and a signal strength associated with a prior connection between the wireless client device and an access point in the wireless network on the preferred wireless communication band;

a storing mechanism coupled to the memory to store, in response to a determination that the wireless client device is capable of communicating on the preferred wireless communication band, the unique MAC address and an indication that the wireless client device is capable of communicating on the preferred wireless communication band, wherein the indication comprises the timestamp and the signal strength; and a controlling mechanism operating with the processor to
in response to the determination that the wireless client device is capable of communicating on the preferred wireless communication band, de-authenticate the wireless client device,
wait for a further request from the wireless client device on the preferred wireless communication band, and
re-authenticate the wireless client device on the preferred wireless communication band.

10. The network device of claim 9, wherein the network conditions are not known to the wireless client device.

11. The network device of claim 9, further comprising:
a transmitting mechanism operating with the processor to transmit a response to the request from the wireless client device on the preferred wireless communication band.

12. The network device of claim 9, further comprising:
a guiding mechanism operating with the processor to guide wireless client devices capable of communicating on the preferred wireless communication band to associate with the wireless network on the preferred wireless communication band.

13. The network device of claim 12, wherein the preferred wireless communication band is different from the non-preferred wireless communication band which is determined to be preferred by the wireless client device.

14. The network device of claim 13, wherein the non-preferred wireless communication band preferred by the wireless client is determined based at least in part on strength of a signal received from the wireless client at the network device.

15. The network device of claim 9, wherein the network conditions further comprise one or more of:
mixed types of network connections;
shared bandwidth;
radio frequency interferences;
wireless network latency; and
wireless network stability.

16. The network device of claim 9,
wherein the determining mechanism further determines that a number of requests received from the wireless client device within a pre-determined time period on the non-preferred wireless communication band exceeds a threshold; and
wherein the network device further comprises a responding mechanism operating with the processor, the responding mechanism to respond to the wireless client device on the non-preferred wireless communication band.

17. The network device of claim 16, wherein the threshold or the pre-determined time period is dynamically adjustable.

18. A non-transitory computer-readable storage medium storing embedded instructions that are executed by one or more mechanisms implemented within a network device to perform a plurality of operations comprising:
receiving a request from a wireless client device on a non-preferred wireless communication band, wherein the wireless network includes a preferred wireless communication band and the non-preferred wireless communication band based on network conditions known to the network device, the network conditions comprising at least network traffic information;
identifying a unique Media Access Control (MAC) address associated with the wireless client device based on the request;
determining whether the wireless client device is capable of communicating on the first preferred wireless communication band based on the unique MAC address identified from the request, and based on a timestamp and a signal strength associated with a prior connection between the wireless client device and an access point in the wireless network on the preferred wireless communication band;
in response to a determination that the wireless client device is capable of communicating on the preferred wireless communication band, storing the unique MAC address and an indication that the wireless client device is capable of communicating on the preferred wireless communication band, wherein the indication comprises the timestamp and the signal strength;
in response to the determination that the wireless client device is capable of communicating on the preferred wireless communication band, ignoring the request from the wireless client device on the non-preferred wireless communication band;
waiting for a further request from the wireless client device on the preferred wireless communication band; and
responding to the wireless client device on the preferred wireless communication band.

19. The non-transitory computer-readable storage medium of claim 18, wherein the network conditions are not known to the wireless client device.

20. The non-transitory computer-readable storage medium of claim 18, further comprising:
transmitting a response to the request from the wireless client device on the preferred wireless communication band.

21. The non-transitory computer-readable storage medium of claim 18, further comprising:
guiding wireless client devices capable of communicating on the preferred wireless communication band to associate with the wireless network on the preferred wireless communication band.

22. The non-transitory computer-readable storage medium of claim 19, wherein the preferred wireless communication band is different from the non-preferred wireless communication band which is determined to be preferred by the wireless client device.

23. The non-transitory computer-readable storage medium of claim 22, wherein the non-preferred wireless communication band preferred by the wireless client is determined based at least in part on strength of a signal received from the wireless client at the network device.

24. The non-transitory computer-readable storage medium of claim 18, wherein the information known to the network device comprises one or more of:
mixed types of network connections;
shared bandwidth;
radio frequency interferences;
wireless network latency; and
wireless network stability.

25. The non-transitory computer-readable storage medium of claim 18, further comprising:

determining that a number of requests received from the wireless client device within a pre-determined time period on the non-preferred wireless communication band exceeds a threshold; and responding to the wireless client device on the non-preferred wireless communication band.

26. The non-transitory computer-readable storage medium of claim 15, wherein the threshold or the pre-determined time period is dynamically adjustable.

\* \* \* \* \*